United States Patent
Lietz et al.

(10) Patent No.: US 9,298,927 B2
(45) Date of Patent: Mar. 29, 2016

(54) METHOD AND SYSTEM FOR PROVIDING AN EFFICIENT VULNERABILITY MANAGEMENT AND VERIFICATION SERVICE

(71) Applicant: Intuit Inc., Mountain View, CA (US)

(72) Inventors: M. Shannon Lietz, San Marcos, CA (US); Luis Felipe Cabrera, Bellevue, WA (US); Barry J. Nisly, San Diego, CA (US); Ted R. Neher, III, Poway, CA (US); Javier Godinez, Bonita, CA (US)

(73) Assignee: Intuit Inc., Mountain View, CA (US)

( * ) Notice: Subject to any disclaimer, the term of this patent is extended or adjusted under 35 U.S.C. 154(b) by 31 days.

(21) Appl. No.: 14/192,529

(22) Filed: Feb. 27, 2014

(65) Prior Publication Data

US 2015/0242634 A1 Aug. 27, 2015

(51) Int. Cl.
G06F 12/14 (2006.01)
G06F 21/57 (2013.01)
H04L 29/06 (2006.01)

(52) U.S. Cl.
CPC .......... *G06F 21/577* (2013.01); *H04L 63/1433* (2013.01)

(58) Field of Classification Search
None
See application file for complete search history.

(56) References Cited

U.S. PATENT DOCUMENTS

| 6,202,066 | B1 | 3/2001 | Barkley et al. |
|---|---|---|---|
| 7,228,438 | B2 | 6/2007 | Bushmitch et al. |
| 7,574,746 | B2 | 8/2009 | Hill et al. |
| 7,577,722 | B1 | 8/2009 | Khandekar et al. |
| 7,640,458 | B2 | 12/2009 | Rao et al. |
| 7,779,247 | B2 | 8/2010 | Roegner |
| 7,792,256 | B1 | 9/2010 | Arledge et al. |
| 7,925,923 | B1 | 4/2011 | Hyser et al. |
| 8,132,231 | B2 | 3/2012 | Amies et al. |
| 8,341,625 | B2 | 12/2012 | Ferris et al. |
| 8,347,281 | B2 | 1/2013 | Arsenault et al. |
| 8,639,923 | B2 | 1/2014 | Lo et al. |
| 8,656,482 | B1 | 2/2014 | Tosa et al. |
| 8,799,431 | B2 | 8/2014 | Pabari |
| 2004/0010571 | A1 | 1/2004 | Hutchinson et al. |
| 2005/0108571 | A1 | 5/2005 | Lu et al. |
| 2005/0183138 | A1 | 8/2005 | Phillips et al. |

(Continued)

FOREIGN PATENT DOCUMENTS

WO WO 2013/123548 8/2013

OTHER PUBLICATIONS

Gryb et al., "Method and System for Validating a Virtual Asset," U.S. Appl. No. 14/070,050, filed Nov. 1, 2013.

(Continued)

*Primary Examiner* — Fatoumata Traore
(74) *Attorney, Agent, or Firm* — Hawley Troxell Ennis & Hawley LLP; Philip McKay

(57) ABSTRACT

A virtual asset creation template associated with a class of virtual assets is identified and analyzed to identify any vulnerabilities in the virtual asset creation template. If one or more vulnerabilities are identified in the virtual asset creation template, an appropriate remedy for each identified vulnerability identified in the virtual asset creation template is applied. If no vulnerability is identified in the virtual asset creation template, or once each vulnerability identified in the virtual asset creation template is remedied, each virtual asset of the virtual asset class generated using the virtual asset creation template is assigned an initial status of verified virtual asset.

25 Claims, 4 Drawing Sheets

(56) References Cited

U.S. PATENT DOCUMENTS

| | | |
|---|---|---|
| 2006/0101519 A1* | 5/2006 | Lasswell et al. ............... 726/25 |
| 2006/0248573 A1 | 11/2006 | Pannu et al. |
| 2007/0043860 A1 | 2/2007 | Pabari |
| 2007/0101400 A1 | 5/2007 | Freeman et al. |
| 2007/0169204 A1 | 7/2007 | Janakiraman et al. |
| 2007/0250424 A1 | 10/2007 | Kothari |
| 2008/0256639 A1 | 10/2008 | Onoda et al. |
| 2009/0177717 A1 | 7/2009 | Meehan et al. |
| 2010/0076987 A1 | 3/2010 | Schreiner |
| 2010/0235828 A1 | 9/2010 | Nishimura et al. |
| 2010/0251363 A1 | 9/2010 | Todorovic |
| 2011/0197065 A1 | 8/2011 | Stauth et al. |
| 2011/0258692 A1 | 10/2011 | Morrison et al. |
| 2012/0151553 A1 | 6/2012 | Burgess et al. |
| 2012/0240193 A1 | 9/2012 | Littlefield et al. |
| 2012/0266167 A1 | 10/2012 | Spiers et al. |
| 2012/0291094 A9 | 11/2012 | Forrester et al. |
| 2012/0304300 A1* | 11/2012 | LaBumbard ................... 726/25 |
| 2012/0324446 A1 | 12/2012 | Fries et al. |
| 2013/0091376 A1 | 4/2013 | Raspudic et al. |
| 2013/0097701 A1 | 4/2013 | Moyle et al. |
| 2013/0117567 A1 | 5/2013 | Chang et al. |
| 2013/0247133 A1 | 9/2013 | Price et al. |
| 2013/0247207 A1 | 9/2013 | Hugard et al. |
| 2013/0304693 A1 | 11/2013 | Jaeger et al. |
| 2013/0326580 A1 | 12/2013 | Barclay et al. |
| 2014/0047546 A1 | 2/2014 | Sidagni |
| 2014/0196104 A1 | 7/2014 | Chari et al. |
| 2014/0282889 A1 | 9/2014 | Ishaya et al. |

OTHER PUBLICATIONS

Weaver et al., "Method and System for Providing and Dynamically Deploying Hardened Task Specific Virtual Hosts," U.S. Appl. No. 14/070,124, filed Nov. 1, 2013.

Cabrera et al., "Method and System for Dynamically and Automatically Managing Resource Access Permissions," U.S. Appl. No. 14/078,715, filed Nov. 13, 2013.

Cabrera et al., "Method and System for Providing a Robust and Efficient Virtual Asset Vulnerability Management and Verification Service," U.S. Appl. No. 14/186,801, filed Feb. 21, 2014.

Lietz et al., "Method and System for Providing Temporary Secure Access Enabled Virtual Assets," U.S. Appl. No. 14/217,653, filed Mar. 18, 2014.

Lietz et al., "Method and System for Providing Self-Monitoring, Self-Reporting, and Self-Repairing Virtual Assets in a Cloud Computing Environment," U.S. Appl. No. 14/256,289, filed Apr. 18, 2014.

Cabrera et al., "Method and System for Providing Automated Self-Healing Virtual Assets," U.S. Appl. No. 14/448,326, filed Jul. 31, 2014.

Lietz et al., "Method and System for Correlating Self-Reporting Virtual Asset Data with External Events to Generate an External Event Identification Database," U.S. Appl. No. 14/448,405, filed Jul. 31, 2014.

Schwarzkopf et al., "Increasing Virtual Machine Security in Cloud Environments," *Journal of Cloud Computing: Advances, Systems and Applications*, Jul. 2012, pp. 1-12.

* cited by examiner

METHOD AND SYSTEM FOR PROVIDING AN EFFICIENT VULNERABILITY MANAGEMENT AND VERIFICATION SERVICE

BACKGROUND

As various forms of distributed computing, such as cloud computing, have come to dominate the computing landscape, security has become a bottleneck issue that currently prevents the complete migration of various capabilities and systems associated with sensitive data, such as financial data, to cloud-based infrastructures, and/or other distributive computing models. This is because any vulnerability in any of the often numerous virtual assets provided and/or utilized in a cloud-based infrastructure, such as operating systems, virtual machines and virtual server instances, connectivity, etc., represents a potential threat.

The types of vulnerabilities of concern varies widely from asset-to asset, application-to-application, development platform-to-development platform, and deployment platform-to-deployment platform. For instance, as an illustrative example, vulnerabilities can take the form of a software flaw, or software created in a known vulnerable version of a language. As another example, a vulnerability can be failure to comply with one or more security policies such as a lack of mandated/proper authentication, an unacceptable level of access, or other insufficient security measures, required to meet the security policies and/or parameters associated with the virtual asset, service, system, application, application development platform, and/or application deployment platform. Consequently, the number, and variety, of potential vulnerabilities can be overwhelming and many currently available vulnerability management and verification approaches lack the ability to track and control these potentially numerous vulnerabilities in any reasonably comprehensive, or even logical, manner.

As noted above, the situation is particularly problematic in cases where sensitive data, such as financial data, is being provided to, processed by, utilized by, and/or distributed by, the various virtual assets, systems, services, and applications within the cloud. This is because exploitation of vulnerabilities in a given virtual asset, system, service, or application can yield devastating results to the owners, even if the breach is an isolated occurrence and is of limited duration. That is to say, with many types of data, developing or deploying a remedy for a vulnerability after that vulnerability has been exploited is no solution at all because irreparable damage may have already been done.

Consequently, the current approaches to vulnerability management that typically involve addressing vulnerabilities on an ad-hoc basis as they arise, or in a simplistic, uncoordinated, static, and largely manual, manner are no longer acceptable. Indeed, in order for applications and systems that process sensitive data to fully migrate to a cloud-based infrastructure, security issues and vulnerabilities must be addressed in a proactive, anticipatory, and comprehensive manner, where the security and invulnerability to attack of virtual assets is verified well before any potential attack can possibly occur, e.g. before deployment and publishing in a production environment.

However, currently, this type of comprehensive approach to vulnerability management and verification with security management policies is largely unavailable. In addition, in the few cases where a comprehensive approach to vulnerability management and verification is attempted, the vulnerabilities are typically analyzed after deployment of the virtual assets and then each virtual asset is individually vulnerability scanned and/or verified in the production environment. Consequently, currently, vulnerability management and verification is prohibitively expensive and resource intensive, often requiring significant amounts of dedicated hardware, software, and human administrators that are still often utilized in an ad-hoc manner.

Despite the situation described above, vulnerability management currently consists largely of the uncoordinated deployment/application of vulnerability analysis to individual virtual assets and/or verification of compliance of individual virtual assets with security management policies. In addition, currently, when a vulnerability or lack of proper security is identified in an individual virtual asset, remedies are typically applied to each virtual asset individually.

As a result, the resources currently required to perform vulnerability and verification processes, and to remedy vulnerabilities are prohibitive and often provide an unacceptable level of data, system, service, and/or application security.

SUMMARY

In accordance with one embodiment, a method and system for providing an efficient vulnerability management and verification service includes identifying a virtual asset creation template associated with a class of virtual assets. In one embodiment, each virtual asset of the class of virtual assets is created using the virtual asset creation template, therefore each virtual asset of the class of virtual assets has the same, or very similar, defined initial operational parameters.

In one embodiment, virtual asset creation template data representing the virtual asset creation template, and/or operations performed in accordance with the virtual asset creation template, is obtained and analyzed to identify any vulnerabilities in the virtual asset creation template data.

In one embodiment, if one or more vulnerabilities are identified in the virtual asset creation template data, an appropriate remedy for each identified vulnerability identified in the virtual asset creation template data is applied at the virtual asset creation template level, as opposed to being performed at the individual virtual asset level as was done in the prior art.

In one embodiment, if no vulnerability is identified in the virtual asset creation template data, or once each vulnerability identified in the virtual asset creation template data is remedied, each virtual asset of the virtual asset class generated using the virtual asset creation template is assumed to be free of the vulnerabilities tested for in the virtual asset creation template data and is assigned an initial status of verified virtual asset.

In one embodiment, the initially verified virtual assets of the virtual asset class generated using the virtual asset creation template are monitored to detect any changes made to any of the initially verified virtual assets. In one embodiment, if a change in an individual initially verified virtual asset is detected, the status of the initially verified virtual asset is transformed from the initial status of verified virtual asset to a status of unverified virtual asset.

In one embodiment, the newly identified unverified virtual asset is then individually analyzed to identify any vulnerabilities in the unverified virtual asset and if one or more vulnerabilities are identified in the unverified virtual asset, a remedy is applied to each vulnerability identified in the unverified virtual asset.

In one embodiment, if no vulnerability is identified in the unverified virtual asset, or after each vulnerability identified in the unverified virtual asset is remedied, the status of the unverified virtual asset is transformed back to a status of verified virtual asset.

In accordance with one embodiment, a method and system for providing an efficient vulnerability management and verification service includes identifying one or more vulnerabilities in a specific virtual asset. In one embodiment, once the one or more vulnerabilities are identified in the specific virtual asset, a virtual asset creation template associated with the specific virtual asset is identified. In one embodiment, each virtual asset in the class of virtual assets of the specific virtual asset is created using the virtual asset creation template, therefore each virtual asset in the class of the specific virtual asset has the same, or very similar, defined initial operational parameters.

In one embodiment, an appropriate remedy for each of the one or more vulnerabilities identified in the specific virtual asset is then obtained. The appropriate remedies for each of the one or more vulnerabilities identified in the specific virtual asset are then applied to the virtual asset creation template used to create the specific virtual asset, and the entire class of virtual assets of the specific virtual asset, as opposed to being applied at the individual virtual asset level for all virtual assets of the class of the specific virtual asset, as was done in the prior art.

In one embodiment, once each vulnerability identified in the specific virtual asset is remedied at the virtual asset creation template level, each virtual asset of the virtual asset class of the specific virtual asset generated using the virtual asset creation template is assumed to be free of the identified vulnerabilities and is assigned an initial status of verified virtual asset.

In one embodiment, the initially verified virtual assets of the virtual asset class of the specific virtual asset generated using the virtual asset creation template are monitored to detect any changes made to any of the initially verified virtual assets. In one embodiment, if a change in an individual initially verified virtual asset is detected, the status of the initially verified virtual asset is transformed from the initial status of verified virtual asset to a status of unverified virtual asset.

In one embodiment, the newly identified unverified virtual asset is then individually analyzed to identify any vulnerabilities in the unverified virtual asset and if one or more vulnerabilities are identified in the unverified virtual asset, a remedy is applied to each vulnerability identified in the unverified virtual asset.

In one embodiment, if no vulnerability is identified in the unverified virtual asset, or after each vulnerability identified in the unverified virtual asset is remedied, the status of the unverified virtual asset is transformed back to a status of verified virtual asset.

Figure 1:
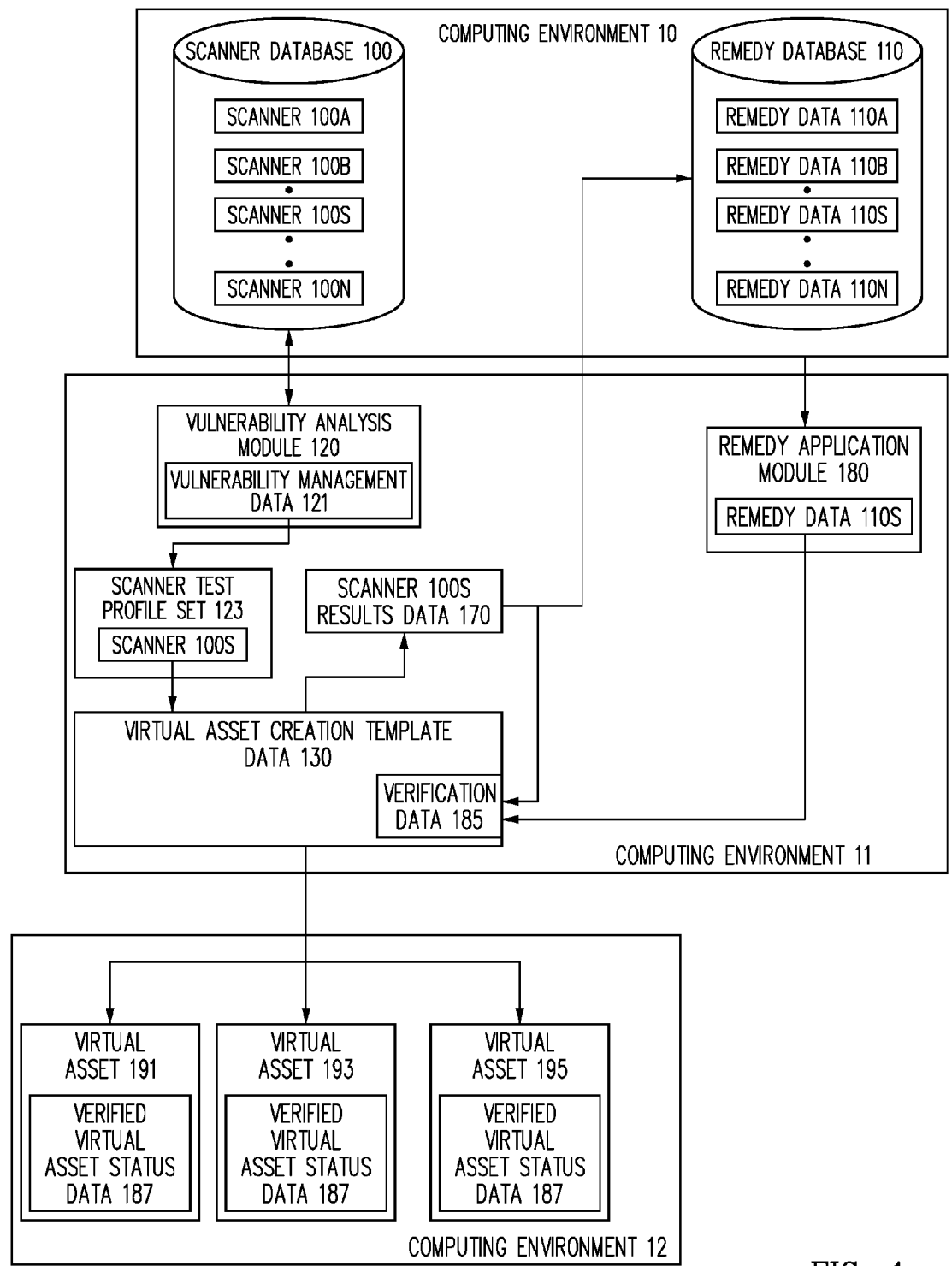
FIG. 1 is a functional block diagram showing the interaction of various elements for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, methods and systems for providing an efficient vulnerability management and verification service include processes for providing an efficient vulnerability management and verification service implemented, at least in part, by one or more computing systems.

As used herein, the term "computing system", includes, but is not limited to, a server computing system; a workstation; a desktop computing system; a database system or storage cluster; a switching system; a router; any hardware system; any communications systems; any form of proxy system; a gateway system; a firewall system; a load balancing system; or any device, subsystem, or mechanism that includes components that can execute all, or part, of any one of the processes and/or operations as described herein.

In addition, as used herein, the term computing system, can denote, but is not limited to, systems made up of multiple server computing systems; workstations; desktop computing systems; database systems or storage clusters; switching systems; routers; hardware systems; communications systems; proxy systems; gateway systems; firewall systems; load balancing systems; or any devices that can be used to perform the processes and/or operations as described herein.

In various embodiments, the one or more computing systems implementing the processes for providing an efficient vulnerability management and verification service are logically or physically located, and/or associated with, two or more computing environments. As used herein, the term "computing environment" includes, but is not limited to, a logical or physical grouping of connected or networked computing systems using the same infrastructure and systems such as, but not limited to, hardware systems, software systems, and networking/communications systems. Typically, computing environments are either known environments, e.g., "trusted" environments, or unknown, e.g., "untrusted" environments. Typically trusted computing environments are those where the components, infrastructure, communication and networking systems, and security systems associated with the computing systems making up the trusted computing environment, are either under the control of, or known to, a party. In contrast, unknown, or untrusted computing environments are environments and systems where the components, infrastructure, communication and networking systems, and security systems implemented and associated with the computing systems making up the untrusted computing environment, are not under the control of, and/or are not known by, a party, and/or are dynamically configured with new elements capable of being added that are unknown to the party.

Examples of trusted computing environments include the components making up data centers associated with, and/or controlled by, a party and/or any computing systems, and/or networks of computing systems, associated with, known by, and/or controlled by, a party. Examples of untrusted computing environments include, but are not limited to, public networks, such as the Internet, various cloud-based computing environments, and various other forms of distributed computing systems.

It is often the case that a party desires to transfer data to, and/or from, a first computing environment that is an untrusted computing environment, such as, but not limited to, a public cloud, a virtual private cloud, and a trusted computing environment, such as, but not limited to, networks of computing systems in a data center controlled by, and/or associated with, the party. However, in other situations a party may wish to transfer data between two trusted computing environments, and/or two untrusted computing environments.

In one embodiment, two or more computing systems, and/or two or more computing environments, are connected by one or more communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

FIG. 1 is a functional diagram of the interaction of various elements associated with one embodiment of the methods and systems for providing an efficient vulnerability management and verification service discussed herein. Of particular note, the various elements in FIG. 1 are shown for illustrative purposes as being associated with specific computing environments, such as computing environment 10, computing environment 11, and computing environment 12. However, the exemplary placement of the various elements within these environments and systems in FIG. 1 is made for illustrative purposes only and, in various embodiments, any individual element shown in FIG. 1, or combination of elements shown in FIG. 1, can be implemented and/or deployed on any of one or more various computing environments or systems, and/or architectural or infrastructure components, such as one or more hardware systems, one or more software systems, one or more data centers, more or more clouds or cloud types, one or more third party service capabilities, or any other computing environments, architectural, and/or infrastructure components as discussed herein, and/or as known in the art at the time of filing, and/or as developed/made available after the time of filing.

In addition, the elements shown in FIG. 1, and/or the computing environments, systems and architectural and/or infrastructure components, deploying the elements shown in FIG. 1, can be under the control of, or otherwise associated with, various parties or entities, or multiple parties or entities, such as, but not limited to, the owner of a data center, a party and/or entity providing all or a portion of a cloud-based computing environment, the owner or a provider of a service, the owner or provider of one or more resources, and/or any other party and/or entity providing one or more functions, and/or any other party and/or entity as discussed herein, and/or as known in the art at the time of filing, and/or as made known after the time of filing.

In one embodiment, a cloud computing environment is provided. In various embodiments, the provided cloud computing environment can be any form of cloud computing environment, such as, but not limited to, a public cloud; a private cloud; a virtual private network (VPN); a subnet; a Virtual Private Cloud, or VPC; a sub-net or any security/communications grouping; or any other cloud-based infrastructure, sub-structure, or architecture, as discussed herein, and/or as known in the art at the time of filing, and/or as developed after the time of filing.

In many cases, a given application or service provided through a cloud computing infrastructure may utilize, and interface with, multiple cloud computing environments, such multiple VPCs, in the course of providing the associated service. In various embodiments, each cloud computing environment includes allocated virtual assets associated with, and controlled or used by, the party utilizing the cloud computing environment.

As used herein, the term "virtual asset" includes any virtualized entity or resource, and/or part of an actual, or "bare metal" entity. In various embodiments, the virtual assets can be, but are not limited to, virtual machines, virtual servers, and instances implemented in a cloud computing environment; databases implemented, or associated with, a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

As discussed in more detail below, some virtual assets are substantially similar to, or identical to, other virtual assets in that the virtual assets have the same, or similar, operational parameters such as the same, or similar, function; the same, or similar, connectivity and communication features; the same, or similar, storage capability allocated to the virtual assets; the same, or similar, processing capability allocated to the virtual assets; the same, or similar, hardware, allocated to the virtual assets; the same, or similar, software allocated to virtual assets; and/or any combination of similar, or identical, operational parameters as discussed herein, and/or as known/available in the art at the time of filing, and/or as developed/made available after the time of filing.

Typically, virtual assets that have the same, or similar, operational parameters are created using the same set of steps, instructions, processes, code, or "recipes". Herein, the set of steps, instructions, processes, code, or recipes used to create virtual assets that have the same, or similar, operational parameters are referred to as "virtual asset creation templates."

Examples of virtual asset creation templates include, but are not limited to, any tool and/or system for creating and managing a collection of related cloud resources that have the same, or similar, operational parameters. One specific illustrative example of such a virtual asset creation template is a cloud formation template such as any of the Amazon Web Service (AWS) cloud formation tools/templates.

Other examples of virtual asset creation templates include, but are not limited to, any configuration management tool associated with, and/or used to create, virtual assets that have the same, or similar, operational parameters. One specific illustrative example of such a virtual asset creation template is a cookbook or recipe tool such as a Chef Recipe or system.

Other examples of virtual asset creation templates include, but are not limited to, any virtual appliance used to instantiate virtual assets that have the same, or similar, operational parameters. One specific illustrative example of such a virtual asset creation template is an Amazon Machine Image (AMI).

Other examples of virtual asset creation templates include, but are not limited to, any virtual appliance, or tool, or system, or framework, used to instantiate virtual assets that have the same, or similar, operational parameters, as discussed herein, and/or as known/available in the art at the time of filing, and/or as developed/made available after the time of filing.

Herein virtual assets that have the same, or similar, operational parameters and are created by the same virtual asset creation template are generically referred to as virtual assets of the same "class." Examples of virtual asset classes include, but are not limited to, virtual machine classes; virtual server classes; virtual database or data store classes; specific types of instances instantiated in a cloud environment; application development process classes; and application classes.

In accordance with one embodiment, a method and system for providing an efficient vulnerability management and verification service includes a process for providing an efficient vulnerability management and verification service whereby a virtual asset creation template associated with a class of virtual assets to be verified is identified.

As noted above, some virtual assets are substantially similar to, or identical to, other virtual assets in that the virtual assets have the same, or similar, operational parameters such as the same, or similar, function; the same, or similar, connectivity and communication features; the same, or similar, storage capability allocated to the virtual assets; the same, or similar, processing capability allocated to the virtual assets; the same, or similar, hardware, allocated to the virtual assets; the same, or similar, software allocated to virtual assets; and/or any combination of similar, or identical, operational parameters as discussed herein, and/or as known/available in the art at the time of filing, and/or as developed/made available after the time of filing.

Typically, virtual assets that have the same, or similar, operational parameters are created using the same set of steps, instructions, processes, code, or "recipes". Herein, the set of steps, instructions, processes, code, or recipes used to create virtual assets that have the same, or similar, operational parameters are referred to as "virtual asset creation templates."

Examples of virtual asset creation templates include, but are not limited to, any tool and/or system for creating and managing a collection of related cloud resources that have the same, or similar, operational parameters. One specific illustrative example of such a virtual asset creation template is a cloud formation template such as any of the Amazon Web Service (AWS) cloud formation tools/templates.

Other examples of virtual asset creation templates include, but are not limited to, any configuration management tool associated with, and/or used to create, virtual assets that have the same, or similar, operational parameters. One specific illustrative example of such a virtual asset creation template is a cookbook or recipe tool such as a Chef Recipe or system.

Other examples of virtual asset creation templates include, but are not limited to, any virtual appliance used to instantiate virtual assets that have the same, or similar, operational parameters. One specific illustrative example of such a virtual asset creation template is an Amazon Machine Image (AMI).

Other examples of virtual asset creation templates include, but are not limited to, any virtual appliance, or tool, or system, or framework, used to instantiate virtual assets that have the same, or similar, operational parameters, as discussed herein, and/or as known/available in the art at the time of filing, and/or as developed/made available after the time of filing.

Herein virtual assets that have the same, or similar, operational parameters and are created by the same virtual asset creation template are generically referred to as virtual assets of the same "class." Examples of virtual asset classes include, but are not limited to, virtual machine classes; virtual server classes; virtual database or data store classes; specific types of instances instantiated in a cloud environment; application development process classes; and application classes.

In one embodiment, the virtual asset creation template associated with, and used to create, a class of virtual assets to be verified is identified. As discussed in more detail below, once a virtual asset creation template is identified, vulnerability analysis and verification is performed at the virtual asset creation template level rather than, as was done in the prior art, performing vulnerability scanning and verification at the individual virtual asset level.

In one embodiment, once the virtual asset creation template associated with, and used to create, a class of virtual assets to be verified is identified, virtual asset creation template data representing the virtual asset creation template is obtained and/or generated.

In one embodiment, the virtual asset creation template data is then analyzed to identify any vulnerabilities in the virtual asset creation template data.

Herein the term "vulnerability" includes not only identified active security weaknesses of a virtual asset, but also any lack of compliance with one or more security policies defined in the vulnerability management data. That is to say, in one embodiment, failure to comply with any defined security policy is considered a vulnerability so that either an active vulnerability or a failure to pass security compliance verification is considered a vulnerability to be checked for as part of the vulnerability analysis. As a result, herein, the terms "verification", "verification analysis" and "vulnerability analysis" are used interchangeably.

In one embodiment, scans are used to identify any vulnerabilities in the virtual asset creation template data. In one embodiment, the scans are selected based on vulnerability management data indicating a vulnerability management policy, specified vulnerabilities, and vulnerability characteristics to be identified and monitored.

In one embodiment, the vulnerability management data is obtained from one or more sources. In various embodiments, the vulnerabilities and vulnerability characteristics included in the vulnerability management data are openly defined, i.e., are open-ended, and include any vulnerabilities and vulnerability characteristics desired by the owner of the virtual asset creation template, and/or virtual assets, such as an application developer, and/or by the provider of the process for providing an efficient vulnerability management and verification service, and/or by a provider of a distributed computing network, such as a cloud, and/or any other parties or entities associated with the security of a distributed computing network, such as a cloud.

FIG. 1 is a functional diagram of the interaction of various elements associated with one embodiment of the method and system for providing an efficient vulnerability management and verification service discussed herein. As seen in FIG. 1, virtual asset creation template data 130 is shown representing a given virtual asset creation template.

Also seen in FIG. 1 is vulnerability management policy and/or vulnerability characteristic data, represented FIG. 1 as vulnerability management data 121 of vulnerability analysis module 120.

In one embodiment, once vulnerability management data is obtained indicating the vulnerability management policies, vulnerabilities, and vulnerability characteristics to be used with the process for providing an efficient vulnerability management and verification service, scanner data composed of one or more vulnerability scanners, referred to herein as "scanners", capable of detecting and monitoring the vulnerabilities and vulnerability characteristics associated the vulnerability management data is generated or obtained.

In various embodiments, the scanners included in the scanner data are designed to monitor or check to determine if specific vulnerabilities discoverable with the scanners are present. In many cases, the scanners are actually sets of scanner tests with each scanner test being associated with, i.e. capable of detecting, a specific vulnerability or vulnerability characteristic.

As noted above, vulnerabilities, and vulnerability characteristics, included in the obtained vulnerability management data are open-endedly defined and subject to change. Consequently, the scanners and scanner tests desirable and/or necessary to ensure compliance with the vulnerability management policies indicated in the vulnerability management data are likely to change over time as well. In addition, new scanners and scanner tests may be required and/or become available, existing scanners and scanner tests may be updated and/or improved, and/or new combinations of desirable scanner tests may become available.

In one embodiment, the virtual asset creation template data is analyzed to identify any vulnerabilities in the virtual asset creation template data using selected scanners capable of detecting and monitoring the vulnerabilities and vulnerability characteristics associated the vulnerability management data.

Referring back to FIG. 1, scanner data including one or more scanners and scanner tests is represented generically by scanner 100A, scanner 100B, scanner 100S, through scanner 100N. As also shown in FIG. 1, scanner 100A, scanner 100B, scanner 100S, through scanner 100N are, in one embodiment, stored in scanner database 100.

As used herein, the term "database" includes, but is not limited to, any data storage mechanism known at the time of filing, or as developed thereafter, such as, but not limited to, a hard drive or memory; a designated server system or computing system, or a designated portion of one or more server systems or computing systems; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

As also seen in FIG. 1, in one embodiment, select ones of scanner 100A, scanner 100B, scanner 100S, through scanner 100N of scanner database 100 are selected for scanner test profile set 123 used for the analysis of virtual asset creation template data 130. As seen in FIG. 1, in this specific example, scanner 100S is selected for scanner test profile set 123 to be used for the analysis of virtual asset creation template data 130.

In one embodiment, if no vulnerabilities are identified in the virtual asset creation template data, the virtual asset creation template is verified and each virtual asset of the virtual asset class generated using the virtual asset creation template is assumed to be free of the vulnerabilities tested for in the virtual asset creation template data and is assigned an initial status of verified virtual asset.

FIG. 1 shows scanner 100S results data 170 indicating the results of the application of scanner 100S of scanner test profile set 123 to virtual asset creation template data 130. In one embodiment, if scanner 100S results data 170 identifies no vulnerabilities in virtual asset creation template data 130, i.e., virtual asset creation template data 130 is verified, scanner 100S results data 170 indicating that no vulnerabilities were found is transferred to verification data 185 and the initial status of verified virtual assets 191, 193, and 195, created using virtual asset creation template data 130, is set, or transformed to, verified virtual asset status data 187.

In one embodiment, if one or more vulnerabilities are identified in the virtual asset creation template data, an appropriate remedy for each identified vulnerability identified in the virtual asset creation template data is identified and applied at the virtual asset creation template level, as opposed to being performed at the individual virtual asset level as was done in the prior art.

In one embodiment, remedy data associated with the vulnerabilities and vulnerability characteristics scanned for by the scanners and scanner tests represented in the scanner data is obtained.

In various embodiments, the remedy data includes remedies or remedy procedures to be implemented on a virtual asset creation template being vulnerability managed once the vulnerability or vulnerability characteristic associated with the remedy or remedy procedure is identified by the one or more scanners and scanner tests. To this end, each of the remedies or remedy procedures indicated in the remedy data is correlated with an associated vulnerability or vulnerability characteristic to which the remedy or remedy procedure applies, and/or the scanner or scanner test used to identify the associated vulnerability or vulnerability characteristic.

In one embodiment, data representing the correlated remedies or remedy procedures indicated in the remedy data, the associated vulnerability or vulnerability characteristics addressed by the remedies or remedy procedures, and/or the scanner or scanner tests used to identify the associated vulnerability or vulnerability characteristics, is stored in a remedy database.

Referring to FIG. 1, remedy data representing the remedies and/or procedures associated with the vulnerabilities and vulnerability characteristics is represented in FIG. 1 as remedy data 110A, remedy data 110B, remedy data 110S, through remedy data 110N stored in remedy database 110.

In one embodiment, each vulnerability identified in the virtual asset creation template data is remedied by applying the identified appropriate remedy to the virtual asset creation template.

Referring to FIG. 1, if scanner 100S results data 170 indicates the vulnerability scanned for by scanner 100S is identified in virtual asset creation template data 130, then the corresponding remedy represented by remedy data 110S is obtained from remedy database 110 and applied to virtual asset creation template data 130 by remedy application module 180.

In one embodiment, once each vulnerability identified in the virtual asset creation template data is remedied, each virtual asset of the virtual asset class generated using the virtual asset creation template is assumed to be free of the vulnerabilities tested for in the virtual asset creation template data and is assigned an initial status of verified virtual asset.

Referring back to FIG. 1, once remedy data 110S is obtained from remedy database 110 and applied to virtual asset creation template data 130 by remedy application module 180, data indicating the identified vulnerability associated with scanner 100S has been closed, and that virtual asset creation template data 130 is verified, is transferred to verification data 185 and the initial status of verified virtual assets 191, 193, and 195, created using virtual asset creation template data 130, is set, or transformed to, verified virtual asset status data 187.

Using the methods and systems for providing an efficient vulnerability management and verification service discussed herein, vulnerability analysis and verification is performed at the virtual asset creation template level so that a single analysis can be performed to initially verify all virtual assets created using a given virtual asset creation template. Consequently, using the methods and systems for providing an efficient vulnerability management and verification service discussed herein, there is no need to individually verify each virtual asset of a virtual asset class created using the verified virtual asset creation template. As a result, minimal resources are required to ensure each virtual asset of a given virtual asset class is free of defined vulnerabilities and/or conforms to various, and dynamically defined, security policies.

Once the individual virtual assets of a virtual asset class created by a verified virtual asset creation template are initially given a status of verified virtual assets, the verified virtual assets are deployed, or published, and used as intended in a production computing environment. However, once deployed, any changes to the state, or operational parameters, of the verified virtual assets can be problematic in that the changes made may open, or reopen, vulnerabilities associated with individual initially verified virtual assets, i.e., the virtual assets may no longer be in a verified state.

To address this issue, in one embodiment, the initially verified virtual assets of the virtual asset class generated using the virtual asset creation template are monitored to detect any changes made to any of the initially verified virtual assets. In one embodiment, if a change in an individual initially verified virtual asset is detected, the status of the initially verified virtual asset is transformed from the initial status of verified virtual asset to a status of unverified virtual asset.

In one embodiment, the newly identified unverified virtual asset is then individually analyzed to identify any vulnerabilities in the unverified virtual asset and if one or more vulnerabilities are identified in the unverified virtual asset, a remedy is applied to each vulnerability identified in the unverified virtual asset.

In one embodiment, if no vulnerability is identified in the unverified virtual asset, or after each vulnerability identified in the unverified virtual asset is remedied, the status of the unverified virtual asset is transformed back to a status of verified virtual asset.

Consequently, using some embodiments of the methods and systems for providing an efficient vulnerability management and verification service discussed herein, vulnerability analysis and verification is performed at the virtual asset creation template level and then if an individual initially verified virtual asset is altered, the status of the altered virtual asset is transformed to that of unverified virtual asset. Then the unverified virtual asset is individually analyzed to determine if any vulnerabilities have been introduced. In this way only changed virtual assets are individually analyzed. This again results in minimal resources being required to ensure each virtual asset of a given virtual asset class is free of defined vulnerabilities and/or conforms to various, and dynamically defined, security policies.

In accordance with one embodiment, a method and system for providing an efficient vulnerability management and verification service includes identifying one or more vulnerabilities in a specific virtual asset. In one embodiment, once the one or more vulnerabilities are identified in the specific virtual asset, a virtual asset creation template associated with the specific virtual asset is identified. In one embodiment, each virtual asset in the class of virtual assets of the specific virtual asset is created using the virtual asset creation template, therefore each virtual asset in the class of the specific virtual asset has the same, or very similar, defined initial operational parameters.

In one embodiment, an appropriate remedy for each of the one or more vulnerabilities identified in the specific virtual asset is then obtained. The appropriate remedies for each of the one or more vulnerabilities identified in the specific virtual asset are then applied to the virtual asset creation template used to create the specific virtual asset, and the entire class of virtual assets of the specific virtual asset, as opposed to being applied at the individual virtual asset level for all virtual assets of the class of the specific virtual asset, as was done in the prior art.

In one embodiment, once each vulnerability identified in the specific virtual asset is remedied at the virtual asset creation template level, each virtual asset of the virtual asset class of the specific virtual asset generated using the virtual asset creation template is assumed to be free of the identified vulnerabilities and is assigned an initial status of verified virtual asset.

In one embodiment, the initially verified virtual assets of the virtual asset class of the specific virtual asset generated using the virtual asset creation template are monitored to detect any changes made to any of the initially verified virtual assets. In one embodiment, if a change in an individual initially verified virtual asset is detected, the status of the initially verified virtual asset is transformed from the initial status of verified virtual asset to a status of unverified virtual asset.

In one embodiment, the newly identified unverified virtual asset is then individually analyzed to identify any vulnerabilities in the unverified virtual asset and if one or more vulnerabilities are identified in the unverified virtual asset, a remedy is applied to each vulnerability identified in the unverified virtual asset.

In one embodiment, if no vulnerability is identified in the unverified virtual asset, or after each vulnerability identified in the unverified virtual asset is remedied, the status of the unverified virtual asset is transformed back to a status of verified virtual asset.

Consequently, using some embodiments of the methods and systems for providing an efficient vulnerability management and verification service discussed herein, a vulnerability is identified at the virtual asset level in a specific virtual asset, such as a specific instance of a virtual asset, and then the remedy to the vulnerability is identified and applied at the virtual asset creation template level. As a result, a single application of a remedy to an identified vulnerability in a specific virtual asset is used to remedy all virtual assets created using the given virtual asset creation template.

Consequently, using the methods and systems for providing an efficient vulnerability management and verification service discussed herein, there is no need to individually remedy each virtual asset of a virtual asset class created using the virtual asset creation template. As a result, minimal resources are required to ensure each virtual asset of a given virtual asset class is free of defined vulnerabilities and/or conforms to various, and dynamically defined, security policies.

Then, if an individual initially verified virtual asset is altered, the status of the altered virtual asset is transformed to that of unverified virtual asset. The unverified virtual asset is then individually analyzed to determine if any vulnerabilities have been introduced. In this way, only changed virtual assets are individually analyzed. This again results in minimal resources being required to ensure each virtual asset of a given virtual asset class is free of defined vulnerabilities and/or conforms to various, and dynamically defined, security policies.

Process

In accordance with one embodiment, a process for providing an efficient vulnerability management and verification service includes identifying a virtual asset creation template associated with a class of virtual assets. In one embodiment, each virtual asset of the class of virtual assets is created using the virtual asset creation template, therefore each virtual asset of the class of virtual assets has the same, or very similar, defined initial operational parameters.

In one embodiment, virtual asset creation template data representing the virtual asset creation template, and/or operations performed in accordance with the virtual asset creation template, is obtained and analyzed to identify any vulnerabilities in the virtual asset creation template data.

In one embodiment, if one or more vulnerabilities are identified in the virtual asset creation template data, an appropriate remedy for each identified vulnerability identified in the virtual asset creation template data is applied at the virtual asset creation template level, as opposed to being performed at the individual virtual asset level as was done in the prior art.

In one embodiment, if no vulnerability is identified in the virtual asset creation template data, or once each vulnerability identified in the virtual asset creation template data is remedied, each virtual asset of the virtual asset class generated using the virtual asset creation template is assumed to be free of the vulnerabilities tested for in the virtual asset creation template data and is assigned an initial status of verified virtual asset.

Figure 2:
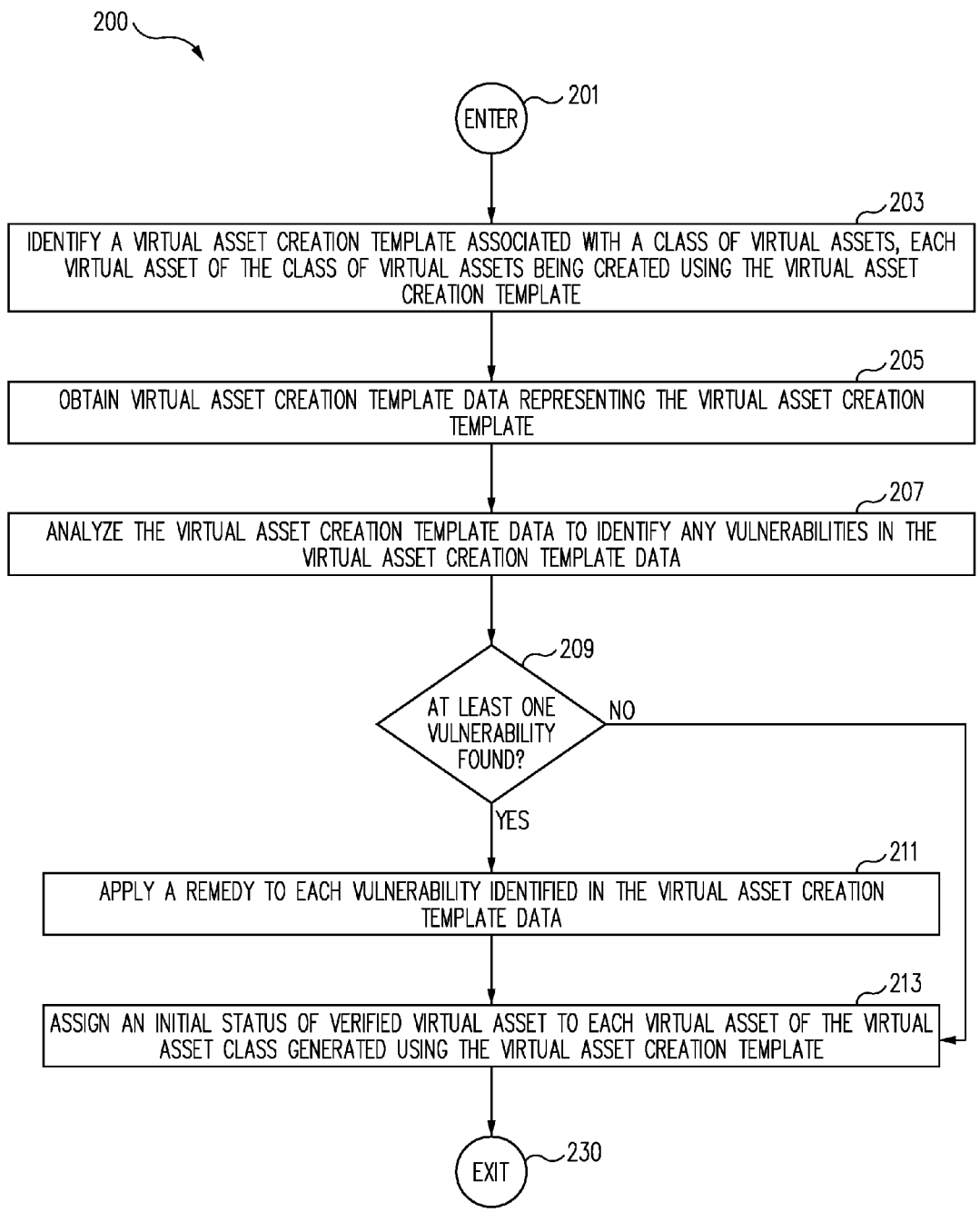
FIG. 2 is a flow chart depicting a process for providing an efficient vulnerability management and verification service in accordance with one embodiment.

FIG. 2 is a flow chart of a process 200 for providing an efficient vulnerability management and verification service.

In one embodiment, process 200 begins at ENTER OPERATION 201 of FIG. 2 and process flow proceeds to IDENTIFY A VIRTUAL ASSET CREATION TEMPLATE ASSOCIATED WITH A CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 203.

In one embodiment, at IDENTIFY A VIRTUAL ASSET CREATION TEMPLATE ASSOCIATED WITH A CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 203 a virtual asset creation template associated with a class of virtual assets is identified.

As noted above, some virtual assets are substantially similar to, or identical to, other virtual assets in that the virtual assets have the same, or similar, operational parameters such as the same, or similar, function; the same, or similar, connectivity and communication features; the same, or similar, storage capability allocated to the virtual assets; the same, or similar, processing capability allocated to the virtual assets; the same, or similar, hardware, allocated to the virtual assets; the same, or similar, software allocated to virtual assets; and/or any combination of similar, or identical, operational parameters as discussed herein, and/or as known/available in the art at the time of filing, and/or as developed/made available after the time of filing.

Typically, virtual assets that have the same, or similar, operational parameters are created using the same set of steps, instructions, processes, code, or "recipes". Herein, the set of steps, instructions, processes, code, or recipes used to create virtual assets that have the same, or similar, operational parameters are referred to as "virtual asset creation templates."

Examples of virtual asset creation templates include, but are not limited to, any tool and/or system for creating and managing a collection of related cloud resources that have the same, or similar, operational parameters. One specific illustrative example of such a virtual asset creation template is a cloud formation template such as any of the Amazon Web Service (AWS) cloud formation tools/templates.

Other examples of virtual asset creation templates include, but are not limited to, any configuration management tool associated with, and/or used to create, virtual assets that have the same, or similar, operational parameters. One specific illustrative example of such a virtual asset creation template is a cookbook or recipe tool such as a Chef Recipe or system.

Other examples of virtual asset creation templates include, but are not limited to, any virtual appliance used to instantiate virtual assets that have the same, or similar, operational parameters. One specific illustrative example of such a virtual asset creation template is an Amazon Machine Image (AMI).

Other examples of virtual asset creation templates include, but are not limited to, any virtual appliance, or tool, or system, or framework, used to instantiate virtual assets that have the same, or similar, operational parameters, as discussed herein, and/or as known/available in the art at the time of filing, and/or as developed/made available after the time of filing.

Herein virtual assets that have the same, or similar, operational parameters and are created by the same virtual asset creation template are generically referred to as virtual assets of the same "class." Examples of virtual asset classes include, but are not limited to, virtual machine classes; virtual server classes; virtual database or data store classes; specific types of instances instantiated in a cloud environment; application development process classes; and application classes.

In one embodiment, the virtual asset creation template associated with, and used to create, a class of virtual assets to be verified is identified at IDENTIFY A VIRTUAL ASSET CREATION TEMPLATE ASSOCIATED WITH A CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 203.

As discussed in more detail below, once a virtual asset creation template is identified at IDENTIFY A VIRTUAL ASSET CREATION TEMPLATE ASSOCIATED WITH A CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 203, vulnerability analysis and verification is performed at the virtual asset creation template level rather than, as was done in the prior art, performing vulnerability scanning and verification at the individual virtual asset level.

In one embodiment, once a virtual asset creation template associated with a class of virtual assets is identified at IDENTIFY A VIRTUAL ASSET CREATION TEMPLATE ASSOCIATED WITH A CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 203, process flow proceeds to OBTAIN VIRTUAL ASSET CREATION TEMPLATE DATA REPRESENTING THE VIRTUAL ASSET CREATION TEMPLATE OPERATION 205

In one embodiment, at OBTAIN VIRTUAL ASSET CREATION TEMPLATE DATA REPRESENTING THE VIRTUAL ASSET CREATION TEMPLATE OPERATION 205 virtual asset creation template data representing the virtual asset creation template of IDENTIFY A VIRTUAL ASSET CREATION TEMPLATE ASSOCIATED WITH A CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 203 is obtained and/or generated.

In one embodiment, once virtual asset creation template data representing the virtual asset creation template of IDENTIFY A VIRTUAL ASSET CREATION TEMPLATE ASSOCIATED WITH A CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 203 is obtained and/or generated at OBTAIN VIRTUAL ASSET CREATION TEMPLATE DATA REPRESENTING THE VIRTUAL ASSET CREATION TEMPLATE OPERATION 205, process flow proceeds to ANALYZE THE VIRTUAL ASSET CREATION TEMPLATE DATA TO IDENTIFY ANY VULNERABILITIES IN THE VIRTUAL ASSET CREATION TEMPLATE DATA OPERATION 207

In one embodiment, at ANALYZE THE VIRTUAL ASSET CREATION TEMPLATE DATA TO IDENTIFY ANY VULNERABILITIES IN THE VIRTUAL ASSET CREATION TEMPLATE DATA OPERATION 207 the virtual asset creation template data of OBTAIN VIRTUAL ASSET CREATION TEMPLATE DATA REPRESENTING THE VIRTUAL ASSET CREATION TEMPLATE OPERATION 205 is analyzed to identify any vulnerabilities in the virtual asset creation template data.

As noted above, herein the term "vulnerability" includes not only identified active security weaknesses of a virtual asset, but also any lack of compliance with one or more security policies defined in the vulnerability management data. That is to say, in one embodiment, failure to comply with any defined security policy is considered a vulnerability so that either an active vulnerability or a failure to pass security compliance verification is considered a vulnerability to be checked for as part of the vulnerability analysis. As a result, herein, the terms "verification", "verification analysis" and "vulnerability analysis" are used interchangeably.

In one embodiment, scans are used at ANALYZE THE VIRTUAL ASSET CREATION TEMPLATE DATA TO IDENTIFY ANY VULNERABILITIES IN THE VIRTUAL ASSET CREATION TEMPLATE DATA OPERATION 207 to identify any vulnerabilities in the virtual asset creation template data. In one embodiment, the scans used at ANALYZE THE VIRTUAL ASSET CREATION TEMPLATE DATA TO IDENTIFY ANY VULNERABILITIES IN THE VIRTUAL ASSET CREATION TEMPLATE DATA OPERATION 207 are selected based on vulnerability management data indicating a vulnerability management policy, specified vulnerabilities, and vulnerability characteristics to be identified and monitored.

In one embodiment, the vulnerability management data is obtained from one or more sources. In various embodiments, the vulnerabilities and vulnerability characteristics included in the vulnerability management data are openly defined, i.e., are open-ended, and include any vulnerabilities and vulnerability characteristics desired by the owner of the virtual asset creation template, and/or virtual assets, such as an application developer, and/or by the provider of process 200 for providing an efficient vulnerability management and verification service, and/or by a provider of a distributed computing network, such as a cloud, and/or any other parties or entities associated with the security of a distributed computing network, such as a cloud.

In one embodiment, once vulnerability management data is obtained indicating the vulnerability management policies, vulnerabilities, and vulnerability characteristics to be used with process 200 for providing an efficient vulnerability management and verification service, scanner data composed of one or more vulnerability scanners, referred to herein as "scanners", capable of detecting and monitoring the vulnerabilities and vulnerability characteristics associated the vulnerability management data is generated or obtained.

In various embodiments, the scanners included in the scanner data are designed to monitor or check to determine if specific vulnerabilities discoverable with the scanners are present. In many cases, the scanners are actually sets of scanner tests with each scanner test being associated with, i.e. capable of detecting, a specific vulnerability or vulnerability characteristic.

As noted above, vulnerabilities, and vulnerability characteristics, included in the obtained vulnerability management data are open-endedly defined and subject to change. Consequently, the scanners and scanner tests desirable and/or necessary to ensure compliance with the vulnerability management policies indicated in the vulnerability management data are likely to change over time as well. In addition, new scanners and scanner tests may be required and/or become available, existing scanners and scanner tests may be updated and/or improved, and/or new combinations of desirable scanner tests may become available.

In one embodiment, at ANALYZE THE VIRTUAL ASSET CREATION TEMPLATE DATA TO IDENTIFY ANY VULNERABILITIES IN THE VIRTUAL ASSET CREATION TEMPLATE DATA OPERATION 207 the virtual asset creation template data of OBTAIN VIRTUAL ASSET CREATION TEMPLATE DATA REPRESENTING THE VIRTUAL ASSET CREATION TEMPLATE OPERATION 205 is analyzed to identify any vulnerabilities in the virtual asset creation template data using selected scanners capable of detecting and monitoring the vulnerabilities and vulnerability characteristics associated the vulnerability management data.

In one embodiment, once the virtual asset creation template data of OBTAIN VIRTUAL ASSET CREATION TEMPLATE DATA REPRESENTING THE VIRTUAL ASSET CREATION TEMPLATE OPERATION 205 is analyzed to identify any vulnerabilities in the virtual asset creation template data at ANALYZE THE VIRTUAL ASSET CREATION TEMPLATE DATA TO IDENTIFY ANY VULNERABILITIES IN THE VIRTUAL ASSET CREATION TEMPLATE DATA OPERATION 207, process flow proceeds to AT LEAST ONE VULNERABILITY FOUND? OPERATION 209.

In one embodiment, at AT LEAST ONE VULNERABILITY FOUND? OPERATION 209 a determination is made as to whether any vulnerabilities were identified as a result of the analysis performed on the virtual asset creation template data of OBTAIN VIRTUAL ASSET CREATION TEMPLATE DATA REPRESENTING THE VIRTUAL ASSET CREATION TEMPLATE OPERATION 205 at ANALYZE THE VIRTUAL ASSET CREATION TEMPLATE DATA TO IDENTIFY ANY VULNERABILITIES IN THE VIRTUAL ASSET CREATION TEMPLATE DATA OPERATION 207.

In one embodiment, if at AT LEAST ONE VULNERABILITY FOUND? OPERATION 209 a determination is made that no vulnerabilities were identified as a result of the analysis performed on the virtual asset creation template data of OBTAIN VIRTUAL ASSET CREATION TEMPLATE DATA REPRESENTING THE VIRTUAL ASSET CREATION TEMPLATE OPERATION 205 at ANALYZE THE VIRTUAL ASSET CREATION TEMPLATE DATA TO IDENTIFY ANY VULNERABILITIES IN THE VIRTUAL ASSET CREATION TEMPLATE DATA OPERATION 207, e.g. a "NO" response is obtained, the virtual asset creation template of IDENTIFY A VIRTUAL ASSET CREATION TEMPLATE ASSOCIATED WITH A CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 203 is verified and process flow proceeds to ASSIGN AN INITIAL STATUS OF VERIFIED VIRTUAL ASSET TO EACH VIRTUAL ASSET OF THE VIRTUAL ASSET CLASS GENERATED USING THE VIRTUAL ASSET CREATION TEMPLATE OPERATION 213.

In one embodiment, if at AT LEAST ONE VULNERABILITY FOUND? OPERATION 209 a determination is made that one or more vulnerabilities were identified as a result of the analysis performed on the virtual asset creation template data of OBTAIN VIRTUAL ASSET CREATION TEMPLATE DATA REPRESENTING THE VIRTUAL ASSET CREATION TEMPLATE OPERATION 205 at ANALYZE THE VIRTUAL ASSET CREATION TEMPLATE DATA TO IDENTIFY ANY VULNERABILITIES IN THE VIRTUAL ASSET CREATION TEMPLATE DATA OPERATION 207, e.g. a "YES" response is obtained, process flow proceeds to APPLY A REMEDY TO EACH VULNERABILITY IDENTIFIED IN THE VIRTUAL ASSET CREATION TEMPLATE DATA OPERATION 211.

In one embodiment, at APPLY A REMEDY TO EACH VULNERABILITY IDENTIFIED IN THE VIRTUAL ASSET CREATION TEMPLATE DATA OPERATION 211 an appropriate remedy for each identified vulnerability identified at ANALYZE THE VIRTUAL ASSET CREATION TEMPLATE DATA TO IDENTIFY ANY VULNERABILITIES IN THE VIRTUAL ASSET CREATION TEMPLATE DATA OPERATION 207 in the virtual asset creation template data of OBTAIN VIRTUAL ASSET CREATION TEMPLATE DATA REPRESENTING THE VIRTUAL ASSET CREATION TEMPLATE OPERATION 205 is identified and applied at the virtual asset creation template level, as opposed to being performed at the individual virtual asset level as was done in the prior art.

In one embodiment, remedy data associated with the vulnerabilities and vulnerability characteristics scanned for by the scanners and scanner tests represented in the scanner data is obtained at APPLY A REMEDY TO EACH VULNERABILITY IDENTIFIED IN THE VIRTUAL ASSET CREATION TEMPLATE DATA OPERATION 211.

In various embodiments, the remedy data includes remedies or remedy procedures to be implemented on a virtual asset creation template being vulnerability managed once the vulnerability or vulnerability characteristic associated with the remedy or remedy procedure is identified by the one or more scanners and scanner tests. To this end, each of the remedies or remedy procedures indicated in the remedy data is correlated with an associated vulnerability or vulnerability characteristic of ANALYZE THE VIRTUAL ASSET CREATION TEMPLATE DATA TO IDENTIFY ANY VULNERABILITIES IN THE VIRTUAL ASSET CREATION TEMPLATE DATA OPERATION 207 to which the remedy or remedy procedure applies, and/or the scanner or scanner test used to identify the associated vulnerability or vulnerability characteristic.

In one embodiment, data representing the correlated remedies or remedy procedures indicated in the remedy data, the associated vulnerability or vulnerability characteristics addressed by the remedies or remedy procedures, and/or the scanner or scanner tests used to identify the associated vulnerability or vulnerability characteristics, is stored in a remedy database.

In one embodiment, each vulnerability identified at ANALYZE THE VIRTUAL ASSET CREATION TEMPLATE DATA TO IDENTIFY ANY VULNERABILITIES IN THE VIRTUAL ASSET CREATION TEMPLATE DATA OPERATION 207 in the virtual asset creation template data of OBTAIN VIRTUAL ASSET CREATION TEMPLATE DATA REPRESENTING THE VIRTUAL ASSET CREATION TEMPLATE OPERATION 205 is remedied at APPLY A REMEDY TO EACH VULNERABILITY IDENTIFIED IN THE VIRTUAL ASSET CREATION TEMPLATE DATA OPERATION 211 by applying the identified appropriate remedy to the virtual asset creation template.

In one embodiment, once each vulnerability identified in the virtual asset creation template data is remedied at APPLY A REMEDY TO EACH VULNERABILITY IDENTIFIED IN THE VIRTUAL ASSET CREATION TEMPLATE DATA OPERATION 211, process flow proceeds to ASSIGN AN INITIAL STATUS OF VERIFIED VIRTUAL ASSET TO EACH VIRTUAL ASSET OF THE VIRTUAL ASSET CLASS GENERATED USING THE VIRTUAL ASSET CREATION TEMPLATE OPERATION 213.

In one embodiment, if no vulnerability is identified in the virtual asset creation template data of OBTAIN VIRTUAL ASSET CREATION TEMPLATE DATA REPRESENTING THE VIRTUAL ASSET CREATION TEMPLATE OPERATION 205 at ANALYZE THE VIRTUAL ASSET CREATION TEMPLATE DATA TO IDENTIFY ANY VULNERABILITIES IN THE VIRTUAL ASSET CREATION TEMPLATE DATA OPERATION 207, or once each vulnerability identified at ANALYZE THE VIRTUAL ASSET CREATION TEMPLATE DATA TO IDENTIFY ANY VULNERABILITIES IN THE VIRTUAL ASSET CREATION TEMPLATE DATA OPERATION 207 in the virtual asset creation template data of OBTAIN VIRTUAL ASSET CREATION TEMPLATE DATA REPRESENTING THE VIRTUAL ASSET CREATION TEMPLATE OPERATION 205 is remedied at APPLY A REMEDY TO EACH VULNERABILITY IDENTIFIED IN THE VIRTUAL ASSET CREATION TEMPLATE DATA OPERATION 211, then at ASSIGN AN INITIAL STATUS OF VERIFIED VIRTUAL ASSET TO EACH VIRTUAL ASSET OF THE VIRTUAL ASSET CLASS GENERATED USING THE VIRTUAL ASSET CREATION TEMPLATE OPERATION 213 each virtual asset of the virtual asset class generated using the virtual asset creation template of IDENTIFY A VIRTUAL ASSET CREATION TEMPLATE ASSOCIATED WITH A CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 203 is assumed to be free of the vulnerabilities tested for in the virtual asset creation template data at ANALYZE THE VIRTUAL ASSET CREATION TEMPLATE DATA TO IDENTIFY ANY VULNERABILITIES IN THE VIRTUAL ASSET CREATION TEMPLATE DATA OPERATION 207 and is assigned an initial status of verified virtual asset.

In one embodiment, if no vulnerability is identified in the virtual asset creation template data of, or once each vulnerability identified in the virtual asset creation template data is remedied, and each virtual asset of the virtual asset class generated using the virtual asset creation template is assigned an initial status of verified virtual asset at ASSIGN AN INITIAL STATUS OF VERIFIED VIRTUAL ASSET TO EACH VIRTUAL ASSET OF THE VIRTUAL ASSET CLASS GENERATED USING THE VIRTUAL ASSET CREATION TEMPLATE OPERATION 213, process flow proceeds to EXIT OPERATION 230

In one embodiment, at EXIT OPERATION 230 process 200 for providing an efficient vulnerability management and verification service is exited to await new data.

Using process 200 for providing an efficient vulnerability management and verification service, vulnerability analysis and verification is performed at the virtual asset creation template level so that a single analysis can be performed to initially verify all virtual assets created using a given virtual asset creation template. Consequently, using process 200 for providing an efficient vulnerability management and verification service there is no need to individually verify each virtual asset of a virtual asset class created using the verified virtual asset creation template. As a result, minimal resources are required to ensure each virtual asset of a given virtual asset class is free of defined vulnerabilities and/or conforms to various, and dynamically defined, security policies.

In accordance with one embodiment, a process for providing an efficient vulnerability management and verification service includes identifying a virtual asset creation template associated with a class of virtual assets. In one embodiment, each virtual asset of the class of virtual assets is created using the virtual asset creation template, therefore each virtual asset of the class of virtual assets has the same, or very similar, defined initial operational parameters.

In one embodiment, virtual asset creation template data representing the virtual asset creation template, and/or operations performed in accordance with the virtual asset creation template, is obtained and analyzed to identify any vulnerabilities in the virtual asset creation template data.

In one embodiment, if one or more vulnerabilities are identified in the virtual asset creation template data, an appropriate remedy for each identified vulnerability identified in the virtual asset creation template data is applied at the virtual asset creation template level, as opposed to being performed at the individual virtual asset level as was done in the prior art.

In one embodiment, if no vulnerability is identified in the virtual asset creation template data, or once each vulnerability identified in the virtual asset creation template data is remedied, each virtual asset of the virtual asset class generated using the virtual asset creation template is assumed to be free of the vulnerabilities tested for in the virtual asset creation template data and is assigned an initial status of verified virtual asset.

In one embodiment, the initially verified virtual assets of the virtual asset class generated using the virtual asset creation template are then monitored to detect any changes made to any of the initially verified virtual assets. In one embodiment, if a change in an individual initially verified virtual asset is detected, the status of the initially verified virtual asset is transformed from the initial status of verified virtual asset to a status of unverified virtual asset.

In one embodiment, the newly identified unverified virtual asset is then individually analyzed to identify any vulnerabilities in the unverified virtual asset and if one or more vulnerabilities are identified in the unverified virtual asset, a remedy is applied to each vulnerability identified in the unverified virtual asset.

In one embodiment, if no vulnerability is identified in the unverified virtual asset, or after each vulnerability identified in the unverified virtual asset is remedied, the status of the unverified virtual asset is transformed back to a status of verified virtual asset.

Figure 3:
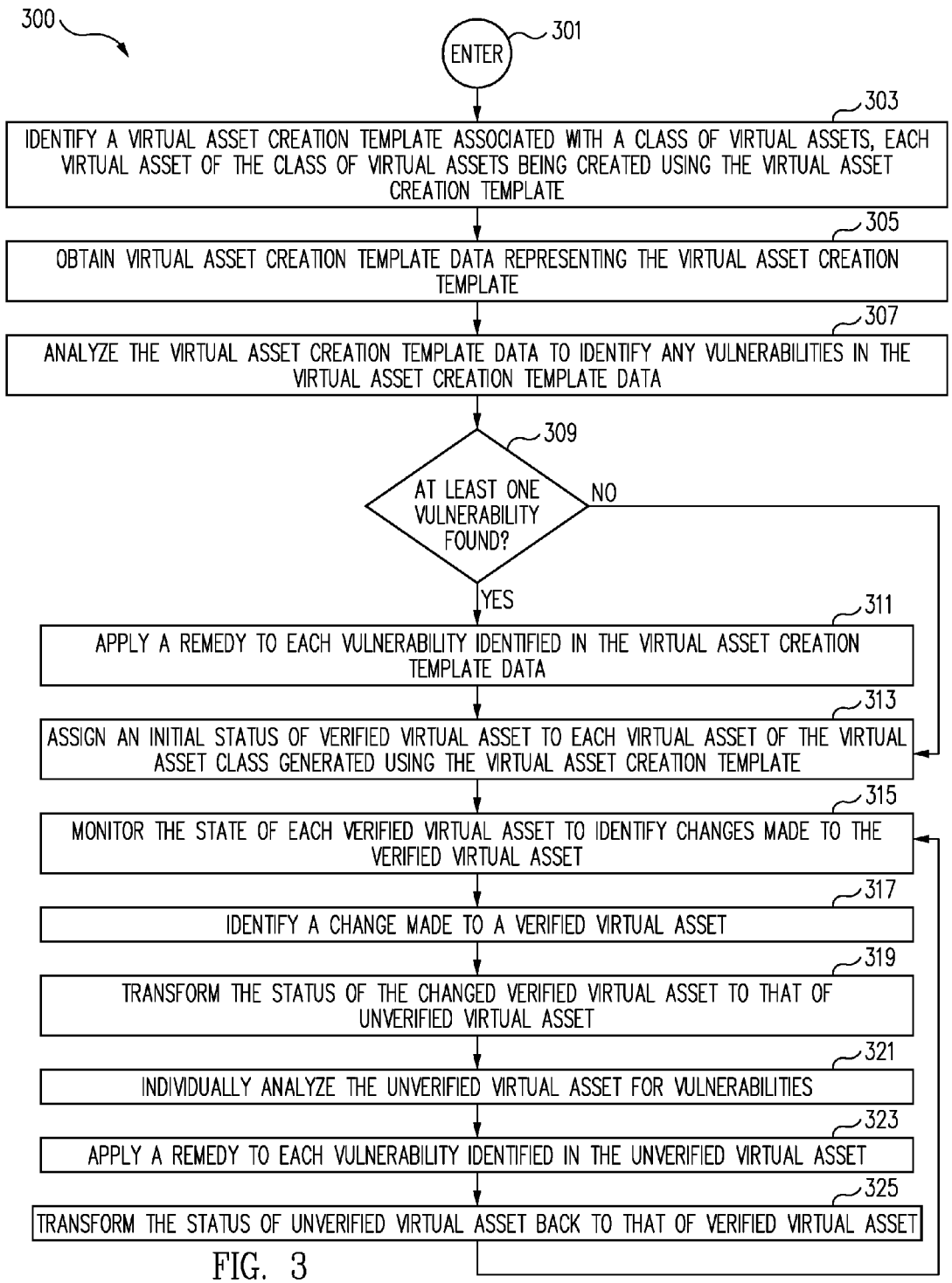
FIG. 3 is a flow chart depicting a process for providing an efficient vulnerability management and verification service in accordance with one embodiment.

FIG. 3 is a flow chart of a process 300 for providing an efficient vulnerability management and verification service.

In one embodiment, process 300 for providing an efficient vulnerability management and verification service begins at ENTER OPERATION 301 of FIG. 3 and process flow proceeds to IDENTIFY A VIRTUAL ASSET CREATION TEMPLATE ASSOCIATED WITH A CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 303.

In one embodiment, IDENTIFY A VIRTUAL ASSET CREATION TEMPLATE ASSOCIATED WITH A CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 303; OBTAIN VIRTUAL ASSET CREATION TEMPLATE DATA REPRESENTING THE VIRTUAL ASSET CREATION TEMPLATE OPERATION 305; ANALYZE THE VIRTUAL ASSET CREATION TEMPLATE DATA TO IDENTIFY ANY VULNERABILITIES IN THE VIRTUAL ASSET CREATION TEMPLATE DATA OPERATION 307; AT LEAST ONE VULNERABILITY FOUND? OPERATION 309; APPLY A REMEDY TO EACH VULNERABILITY IDENTIFIED IN THE VIRTUAL ASSET CREATION TEMPLATE DATA OPERATION 311; and ASSIGN AN INITIAL STATUS OF VERIFIED VIRTUAL ASSET TO EACH VIRTUAL ASSET OF THE VIRTUAL ASSET CLASS GENERATED USING THE VIRTUAL ASSET CREATION TEMPLATE OPERATION 313 of process 300 for providing an efficient vulnerability management and verification service are substantially identical to IDENTIFY A VIRTUAL ASSET CREATION TEMPLATE ASSOCIATED WITH A CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 203; OBTAIN VIRTUAL ASSET CREATION TEMPLATE DATA REPRESENTING THE VIRTUAL ASSET CREATION TEMPLATE OPERATION 205; ANALYZE THE VIRTUAL ASSET CREATION TEMPLATE DATA TO IDENTIFY ANY VULNERABILITIES IN THE VIRTUAL ASSET CREATION TEMPLATE DATA OPERATION 207; AT LEAST ONE VULNERABILITY FOUND? OPERATION 209; APPLY A REMEDY TO EACH VULNERABILITY IDENTIFIED IN THE VIRTUAL ASSET CREATION TEMPLATE DATA OPERATION 211; and ASSIGN AN INITIAL STATUS OF VERIFIED VIRTUAL ASSET TO EACH VIRTUAL ASSET OF THE VIRTUAL ASSET CLASS GENERATED USING THE VIRTUAL ASSET CREATION TEMPLATE OPERATION 213 of process 200 for providing an efficient vulnerability management and verification service.

Consequently the reader is referred to the discussion above for a more detailed description of IDENTIFY A VIRTUAL ASSET CREATION TEMPLATE ASSOCIATED WITH A CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 303; OBTAIN VIRTUAL ASSET CREATION TEMPLATE DATA REPRESENTING THE VIRTUAL ASSET CREATION TEMPLATE OPERATION 305; ANALYZE THE VIRTUAL ASSET CREATION TEMPLATE DATA TO IDENTIFY ANY VULNERABILITIES IN THE VIRTUAL ASSET CREATION TEMPLATE DATA OPERATION 307; AT LEAST ONE VULNERABILITY FOUND? OPERATION 309; APPLY A REMEDY TO EACH VULNERABILITY IDENTIFIED IN THE VIRTUAL ASSET CREATION TEMPLATE DATA OPERATION 311; and ASSIGN AN INITIAL STATUS OF VERIFIED VIRTUAL ASSET TO EACH VIRTUAL ASSET OF THE VIRTUAL ASSET CLASS GENERATED USING THE VIRTUAL ASSET CREATION TEMPLATE OPERATION 313.

In one embodiment, once the individual virtual assets of a virtual asset class created by a verified virtual asset creation template of IDENTIFY A VIRTUAL ASSET CREATION TEMPLATE ASSOCIATED WITH A CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 303 are initially given a status of verified virtual assets at ASSIGN AN INITIAL STATUS OF VERIFIED VIRTUAL ASSET TO EACH VIRTUAL ASSET OF THE VIRTUAL ASSET CLASS GENERATED USING THE VIRTUAL ASSET CREATION TEMPLATE OPERATION 313, the verified virtual assets are deployed, or published, and used as intended in a production computing environment.

However, once deployed, any changes to the state, or operational parameters, of the verified virtual assets of ASSIGN AN INITIAL STATUS OF VERIFIED VIRTUAL ASSET TO EACH VIRTUAL ASSET OF THE VIRTUAL ASSET CLASS GENERATED USING THE VIRTUAL ASSET CREATION TEMPLATE OPERATION 313 can be problematic in that the changes made may open, or reopen, vulnerabilities associated with individual initially verified virtual assets, i.e., the virtual assets may no longer be in a verified state.

To address this issue, in one embodiment, at MONITOR THE STATE OF EACH VERIFIED VIRTUAL ASSET TO IDENTIFY CHANGES MADE TO THE VERIFIED VIRTUAL ASSET OPERATION 315, the initially verified virtual assets of ASSIGN AN INITIAL STATUS OF VERIFIED VIRTUAL ASSET TO EACH VIRTUAL ASSET OF THE VIRTUAL ASSET CLASS GENERATED USING THE VIRTUAL ASSET CREATION TEMPLATE OPERATION 313 are monitored to detect any changes made to any of the initially verified virtual assets.

In one embodiment, once at MONITOR THE STATE OF EACH VERIFIED VIRTUAL ASSET TO IDENTIFY CHANGES MADE TO THE VERIFIED VIRTUAL ASSET OPERATION 315, the initially verified virtual assets of ASSIGN AN INITIAL STATUS OF VERIFIED VIRTUAL ASSET TO EACH VIRTUAL ASSET OF THE VIRTUAL ASSET CLASS GENERATED USING THE VIRTUAL ASSET CREATION TEMPLATE OPERATION 313 are being monitored to detect any changes made to any of the initially verified virtual assets, process flow proceeds to IDENTIFY A CHANGE MADE TO A VERIFIED VIRTUAL ASSET OPERATION 317.

In one embodiment, at IDENTIFY A CHANGE MADE TO A VERIFIED VIRTUAL ASSET OPERATION 317 a change in an individual initially verified virtual asset of ASSIGN AN INITIAL STATUS OF VERIFIED VIRTUAL ASSET TO EACH VIRTUAL ASSET OF THE VIRTUAL ASSET CLASS GENERATED USING THE VIRTUAL ASSET CREATION TEMPLATE OPERATION 313 is detected.

In one embodiment, once a change in an individual initially verified virtual asset of ASSIGN AN INITIAL STATUS OF VERIFIED VIRTUAL ASSET TO EACH VIRTUAL ASSET OF THE VIRTUAL ASSET CLASS GENERATED USING THE VIRTUAL ASSET CREATION TEMPLATE OPERATION 313 is detected at IDENTIFY A CHANGE MADE TO A VERIFIED VIRTUAL ASSET OPERATION 317, process flow proceeds to TRANSFORM THE STATUS OF THE CHANGED VERIFIED VIRTUAL ASSET TO THAT OF UNVERIFIED VIRTUAL ASSET OPERATION 319.

In one embodiment, at TRANSFORM THE STATUS OF THE CHANGED VERIFIED VIRTUAL ASSET TO THAT OF UNVERIFIED VIRTUAL ASSET OPERATION 319 the status of the initially verified virtual asset detected as being changed at IDENTIFY A CHANGE MADE TO A VERIFIED VIRTUAL ASSET OPERATION 317 is transformed from the initial status of verified virtual asset of ASSIGN AN INITIAL STATUS OF VERIFIED VIRTUAL ASSET TO EACH VIRTUAL ASSET OF THE VIRTUAL ASSET CLASS GENERATED USING THE VIRTUAL ASSET CREATION TEMPLATE OPERATION 313 to a status of unverified virtual asset.

In one embodiment, once the status of the initially verified virtual asset detected as being changed at IDENTIFY A CHANGE MADE TO A VERIFIED VIRTUAL ASSET OPERATION 317 is transformed from the initial status of verified virtual asset of ASSIGN AN INITIAL STATUS OF VERIFIED VIRTUAL ASSET TO EACH VIRTUAL ASSET OF THE VIRTUAL ASSET CLASS GENERATED USING THE VIRTUAL ASSET CREATION TEMPLATE OPERATION 313 to a status of unverified virtual asset at TRANSFORM THE STATUS OF THE CHANGED VERIFIED VIRTUAL ASSET TO THAT OF UNVERIFIED VIRTUAL ASSET OPERATION 319, process flow proceeds to INDIVIDUALLY ANALYZE THE UNVERIFIED VIRTUAL ASSET FOR VULNERABILITIES OPERATION 321.

In one embodiment, at INDIVIDUALLY ANALYZE THE UNVERIFIED VIRTUAL ASSET FOR VULNERABILITIES OPERATION 321 the newly identified unverified virtual asset of TRANSFORM THE STATUS OF THE CHANGED VERIFIED VIRTUAL ASSET TO THAT OF UNVERIFIED VIRTUAL ASSET OPERATION 319 is individually analyzed to identify any vulnerabilities in the unverified virtual asset and if one or more vulnerabilities are identified in the unverified virtual asset at INDIVIDUALLY ANALYZE THE UNVERIFIED VIRTUAL ASSET FOR VULNERABILITIES OPERATION 321, a remedy is applied to each vulnerability identified in the unverified virtual asset at APPLY A REMEDY TO EACH VULNERABILITY IDENTIFIED IN THE UNVERIFIED VIRTUAL ASSET OPERATION 323.

In one embodiment, if no vulnerability is identified in the unverified virtual asset at INDIVIDUALLY ANALYZE THE UNVERIFIED VIRTUAL ASSET FOR VULNERABILITIES OPERATION 321, or after each vulnerability identified in the unverified virtual asset is remedied at REMEDY TO EACH VULNERABILITY IDENTIFIED IN THE UNVERIFIED VIRTUAL ASSET OPERATION 323, process flow proceeds to TRANSFORM THE STATUS OF UNVERIFIED VIRTUAL ASSET BACK TO THAT OF VERIFIED VIRTUAL ASSET OPERATION 325.

In one embodiment, at TRANSFORM THE STATUS OF UNVERIFIED VIRTUAL ASSET BACK TO THAT OF VERIFIED VIRTUAL ASSET OPERATION 325 the status of the unverified virtual asset of TRANSFORM THE STATUS OF THE CHANGED VERIFIED VIRTUAL ASSET TO THAT OF UNVERIFIED VIRTUAL ASSET OPERATION 319 is transformed back to a status of verified virtual asset.

In one embodiment, once the status of the unverified virtual asset of TRANSFORM THE STATUS OF THE CHANGED VERIFIED VIRTUAL ASSET TO THAT OF UNVERIFIED VIRTUAL ASSET OPERATION 319 is transformed back to a status of verified virtual asset at TRANSFORM THE STATUS OF UNVERIFIED VIRTUAL ASSET BACK TO THAT OF VERIFIED VIRTUAL ASSET OPERATION 325, process flow proceeds back to MONITOR THE STATE OF EACH VERIFIED VIRTUAL ASSET TO IDENTIFY CHANGES MADE TO THE VERIFIED VIRTUAL ASSET OPERATION 315.

As noted above, at MONITOR THE STATE OF EACH VERIFIED VIRTUAL ASSET TO IDENTIFY CHANGES MADE TO THE VERIFIED VIRTUAL ASSET OPERATION 315, the verified virtual assets are monitored to detect any changes made to any of the verified virtual assets.

Using process 300 for providing an efficient vulnerability management and verification service, vulnerability analysis and verification is performed at the virtual asset creation template level and then if an individual initially verified virtual asset is altered, the status of the altered virtual asset is transformed to that of unverified virtual asset. Then the unverified virtual asset is individually analyzed to determine if any vulnerabilities have been introduced. Consequently, using process 300 for providing an efficient vulnerability management and verification service, only changed virtual assets are individually analyzed. Thus, using process 300 for providing an efficient vulnerability management and verification service results in minimal resources being required to ensure each virtual asset of a given virtual asset class is free of defined vulnerabilities and/or conforms to various, and dynamically defined, security policies.

In accordance with one embodiment, a method and system for providing an efficient vulnerability management and verification service includes identifying one or more vulnerabilities in a specific virtual asset. In one embodiment, once the one or more vulnerabilities are identified in the specific virtual asset, a virtual asset creation template associated with the specific virtual asset is identified. In one embodiment, each virtual asset in the class of virtual assets of the specific virtual asset is created using the virtual asset creation template, therefore each virtual asset in the class of the specific virtual asset has the same, or very similar, defined initial operational parameters.

In one embodiment, an appropriate remedy for each of the one or more vulnerabilities identified in the specific virtual asset is then obtained. The appropriate remedies for each of the one or more vulnerabilities identified in the specific virtual asset are then applied to the virtual asset creation template used to create the specific virtual asset, and the entire class of virtual assets of the specific virtual asset, as opposed to being applied at the individual virtual asset level for all virtual assets of the class of the specific virtual asset, as was done in the prior art.

In one embodiment, once each vulnerability identified in the specific virtual asset is remedied at the virtual asset creation template level, each virtual asset of the virtual asset class of the specific virtual asset generated using the virtual asset creation template is assumed to be free of the identified vulnerabilities and is assigned an initial status of verified virtual asset.

In one embodiment, the initially verified virtual assets of the virtual asset class of the specific virtual asset generated using the virtual asset creation template are monitored to detect any changes made to any of the initially verified virtual assets. In one embodiment, if a change in an individual initially verified virtual asset is detected, the status of the initially verified virtual asset is transformed from the initial status of verified virtual asset to a status of unverified virtual asset.

In one embodiment, the newly identified unverified virtual asset is then individually analyzed to identify any vulnerabilities in the unverified virtual asset and if one or more vulnerabilities are identified in the unverified virtual asset, a remedy is applied to each vulnerability identified in the unverified virtual asset.

In one embodiment, if no vulnerability is identified in the unverified virtual asset, or after each vulnerability identified in the unverified virtual asset is remedied, the status of the unverified virtual asset is transformed back to a status of verified virtual asset.

Figure 4:
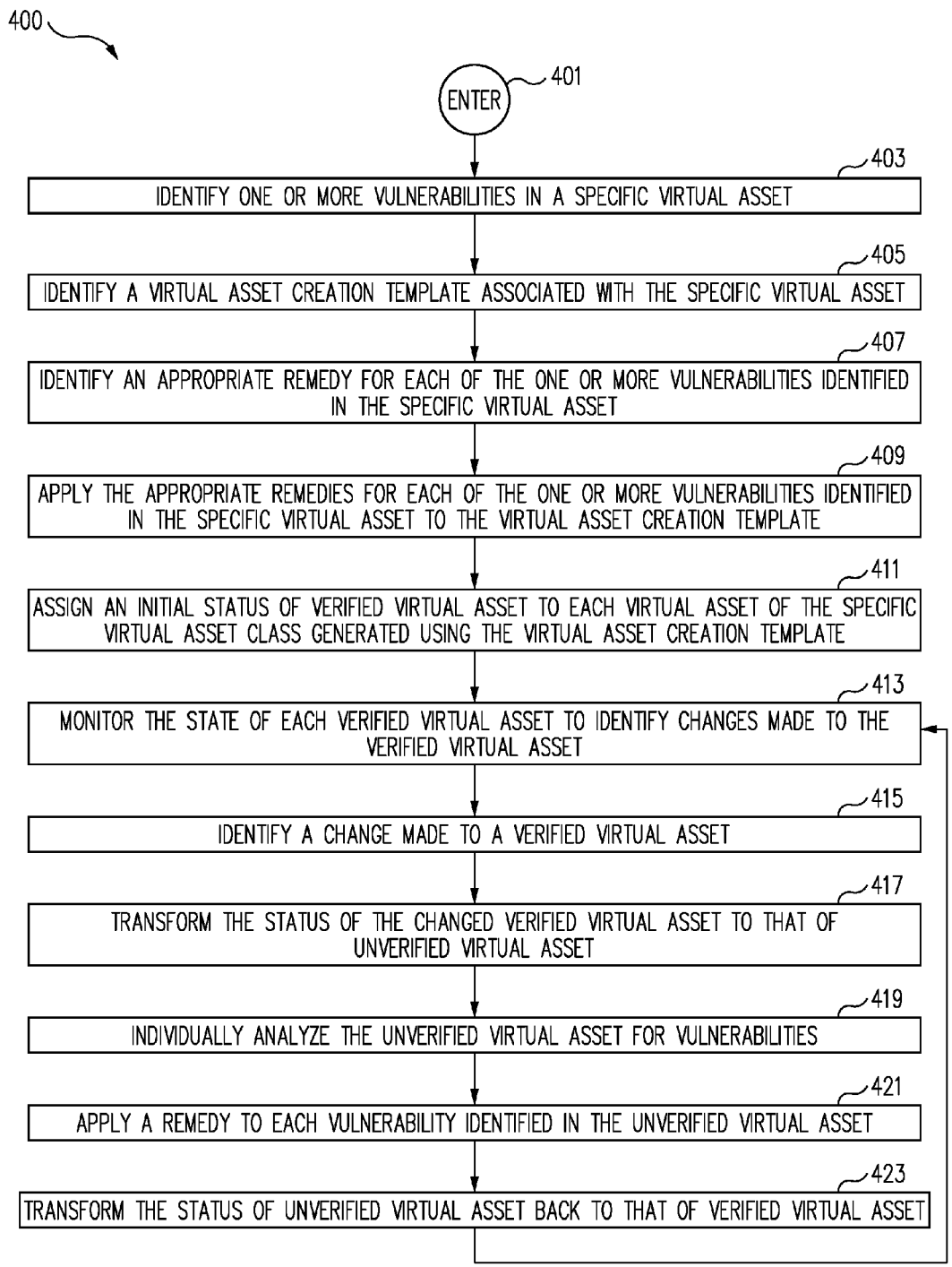
FIG. 4 is a flow chart depicting a process for providing an efficient vulnerability management and verification service in accordance with one embodiment.

FIG. 4 is a flow chart of a process 400 for providing an efficient vulnerability management and verification service.

In one embodiment, process 400 begins at ENTER OPERATION 401 of FIG. 4 and process flow proceeds to IDENTIFY ONE OR MORE VULNERABILITIES IN A SPECIFIC VIRTUAL ASSET OPERATION 403.

In one embodiment, at IDENTIFY ONE OR MORE VULNERABILITIES IN A SPECIFIC VIRTUAL ASSET OPERATION 403 one or more vulnerabilities in a specific virtual asset are identified.

In one embodiment, the specific virtual asset of IDENTIFY ONE OR MORE VULNERABILITIES IN A SPECIFIC VIRTUAL ASSET OPERATION 403 is a specific instance of a virtual asset, such as, but not limited to, a specific instance of a virtual server.

In one embodiment, at IDENTIFY ONE OR MORE VULNERABILITIES IN A SPECIFIC VIRTUAL ASSET OPERATION 403 the one or more vulnerabilities are identified in the specific virtual asset using one or more scans. In one embodiment, the scans used at IDENTIFY ONE OR MORE VULNERABILITIES IN A SPECIFIC VIRTUAL ASSET OPERATION 403 are selected based on vulnerability management data indicating a vulnerability management policy, specified vulnerabilities, and vulnerability characteristics to be identified and monitored.

In one embodiment, the vulnerability management data is obtained from one or more sources. In various embodiments, the vulnerabilities and vulnerability characteristics included in the vulnerability management data are openly defined, i.e., are open-ended, and include any vulnerabilities and vulnerability characteristics desired by the owner of the virtual asset creation template, and/or virtual assets, such as an application developer, and/or by the provider of process 400 for providing an efficient vulnerability management and verification service, and/or by a provider of a distributed computing network, such as a cloud, and/or any other parties or entities associated with the security of a distributed computing network, such as a cloud.

In one embodiment, once vulnerability management data is obtained indicating the vulnerability management policies, vulnerabilities, and vulnerability characteristics to be used with process 400 for providing an efficient vulnerability management and verification service, scanner data composed of one or more vulnerabilities scanners, referred to herein as "scanners", capable of detecting and monitoring the vulnerabilities and vulnerability characteristics associated the vulnerability management data is generated or obtained.

As noted above, herein the term "vulnerability" includes not only identified active security weaknesses of a virtual asset, but any lack of compliance with one or more security policies defined in the vulnerability management data. That is to say, in one embodiment, failure to comply with any defined security policy is considered a vulnerability so that either an active vulnerability or a failure to pass security compliance verification is considered a vulnerability to be checked for as part of the vulnerability analysis. As a result, herein, the terms "verification", "verification analysis" and "vulnerability analysis" are used interchangeably.

In various embodiments, the scanners included in the scanner data are designed to monitor or check to determine if specific vulnerabilities discoverable with the scanners are present. In many cases, the scanners are actually sets of scanner tests with each scanner test being associated with, i.e. capable of detecting, a specific vulnerability or vulnerability characteristic.

As noted above, vulnerabilities, and vulnerability characteristics, included in the obtained vulnerability management data are open-endedly defined and subject to change. Consequently, the scanners and scanner tests desirable and/or necessary to ensure compliance with the vulnerability management policies indicated in the vulnerability management data are likely to change over time as well. In addition, new scanners and scanner tests may be required and/or become available, existing scanners and scanner tests may be updated and/or improved, and/or new combinations of desirable scanner tests may become available.

In one embodiment, at IDENTIFY ONE OR MORE VULNERABILITIES IN A SPECIFIC VIRTUAL ASSET OPERATION 403 the specific virtual asset is analyzed to identify any vulnerabilities, or lack of compliance with security policy, in the specific virtual asset using selected scanners capable of detecting and monitoring the vulnerabilities and vulnerability characteristics associated the vulnerability management data.

In one embodiment, once one or more vulnerabilities in a specific virtual asset are identified at IDENTIFY ONE OR MORE VULNERABILITIES IN A SPECIFIC VIRTUAL ASSET OPERATION 403, process flow proceeds to IDENTIFY A VIRTUAL ASSET CREATION TEMPLATE ASSOCIATED WITH THE SPECIFIC VIRTUAL ASSET OPERATION 405.

In one embodiment, at IDENTIFY A VIRTUAL ASSET CREATION TEMPLATE ASSOCIATED WITH THE SPECIFIC VIRTUAL ASSET OPERATION 405 a virtual asset creation template associated with the class of virtual assets of the specific virtual asset of IDENTIFY ONE OR MORE VULNERABILITIES IN A SPECIFIC VIRTUAL ASSET OPERATION 403 is identified.

As noted above, some virtual assets are substantially similar to, or identical to, other virtual assets in that the virtual assets have the same, or similar, operational parameters such as the same, or similar, function; the same, or similar, connectivity and communication features; the same, or similar, storage capability allocated to the virtual assets; the same, or similar, processing capability allocated to the virtual assets; the same, or similar, hardware, allocated to the virtual assets; the same, or similar, software allocated to virtual assets; and/ or any combination of similar, or identical, operational parameters as discussed herein, and/or as known/available in the art at the time of filing, and/or as developed/made available after the time of filing.

Typically, virtual assets that have the same, or similar, operational parameters are created using the same set of steps, instructions, processes, code, or "recipes". Herein, the set of steps, instructions, processes, code, or recipes used to create virtual assets that have the same, or similar, operational parameters are referred to as "virtual asset creation templates."

Examples of virtual asset creation templates include, but are not limited to, any tool and/or system for creating and managing a collection of related cloud resources that have the same, or similar, operational parameters. One specific illustrative example of such a virtual asset creation template is a cloud formation template such as any of the Amazon Web Service (AWS) cloud formation tools/templates.

Other examples of virtual asset creation templates include, but are not limited to, any configuration management tool associated with, and/or used to create, virtual assets that have the same, or similar, operational parameters. One specific illustrative example of such a virtual asset creation template is a cookbook or recipe tool such as a Chef Recipe or system.

Other examples of virtual asset creation templates include, but are not limited to, any virtual appliance used to instantiate virtual assets that have the same, or similar, operational parameters. One specific illustrative example of such a virtual asset creation template is an Amazon Machine Image (AMI).

Other examples of virtual asset creation templates include, but are not limited to, any virtual appliance, or tool, or system, or framework, used to instantiate virtual assets that have the same, or similar, operational parameters, as discussed herein, and/or as known/available in the art at the time of filing, and/or as developed/made available after the time of filing.

Herein virtual assets that have the same, or similar, operational parameters and are created by the same virtual asset creation template are generically referred to as virtual assets of the same "class." Examples of virtual asset classes include, but are not limited to, virtual machine classes; virtual server classes; virtual database or data store classes; specific types of instances instantiated in a cloud environment; application development process classes; and application classes.

In one embodiment, once a virtual asset creation template associated with the class of virtual assets of the specific virtual asset of IDENTIFY ONE OR MORE VULNERABILITIES IN A SPECIFIC VIRTUAL ASSET OPERATION 403 is identified at IDENTIFY A VIRTUAL ASSET CREATION TEMPLATE ASSOCIATED WITH THE SPECIFIC VIRTUAL ASSET OPERATION 405, process flow proceeds to IDENTIFY AN APPROPRIATE REMEDY FOR EACH OF THE ONE OR MORE VULNERABILITIES IDENTIFIED IN THE SPECIFIC VIRTUAL ASSET OPERATION 407.

In one embodiment, at IDENTIFY AN APPROPRIATE REMEDY FOR EACH OF THE ONE OR MORE VULNERABILITIES IDENTIFIED IN THE SPECIFIC VIRTUAL ASSET OPERATION 407 an appropriate remedy for each of the one or more vulnerabilities identified in the specific virtual asset of IDENTIFY ONE OR MORE VULNERABILITIES IN A SPECIFIC VIRTUAL ASSET OPERATION 403 is obtained.

In one embodiment, remedy data associated with the vulnerabilities and vulnerability characteristics scanned for by the scanners and scanner tests represented in the scanner data is obtained at IDENTIFY AN APPROPRIATE REMEDY FOR EACH OF THE ONE OR MORE VULNERABILITIES IDENTIFIED IN THE SPECIFIC VIRTUAL ASSET OPERATION 407.

In various embodiments, the remedy data includes remedies or remedy procedures to be implemented on a virtual asset being vulnerability managed once the vulnerability or vulnerability characteristic associated with the remedy or remedy procedure is identified by the one or more scanners and scanner tests. To this end, each of the remedies or remedy procedures indicated in the remedy data is correlated with an associated vulnerability or vulnerability characteristic of IDENTIFY ONE OR MORE VULNERABILITIES IN A SPECIFIC VIRTUAL ASSET OPERATION 403 to which the remedy or remedy procedure applies, and/or the scanner or scanner test used to identify the associated vulnerability or vulnerability characteristic.

In one embodiment, data representing the correlated remedies or remedy procedures indicated in the remedy data, the associated vulnerability or vulnerability characteristics addressed by the remedies or remedy procedures, and/or the scanner or scanner tests used to identify the associated vulnerability or vulnerability characteristics, is stored in a remedy database.

In one embodiment, once an appropriate remedy for each of the one or more vulnerabilities identified in the specific virtual asset of IDENTIFY ONE OR MORE VULNERABILITIES IN A SPECIFIC VIRTUAL ASSET OPERATION 403 is obtained at IDENTIFY AN APPROPRIATE REMEDY FOR EACH OF THE ONE OR MORE VULNERABILITIES IDENTIFIED IN THE SPECIFIC VIRTUAL ASSET OPERATION 407, process flow proceeds to APPLY THE APPROPRIATE REMEDIES FOR EACH OF THE ONE OR MORE VULNERABILITIES IDENTIFIED IN THE SPECIFIC VIRTUAL ASSET TO THE VIRTUAL ASSET CREATION TEMPLATE OPERATION 409.

In one embodiment, at APPLY THE APPROPRIATE REMEDIES FOR EACH OF THE ONE OR MORE VULNERABILITIES IDENTIFIED IN THE SPECIFIC VIRTUAL ASSET TO THE VIRTUAL ASSET CREATION TEMPLATE OPERATION 409 the appropriate remedies of IDENTIFY AN APPROPRIATE REMEDY FOR EACH OF THE ONE OR MORE VULNERABILITIES IDENTIFIED IN THE SPECIFIC VIRTUAL ASSET OPERATION 407 for each of the one or more vulnerabilities identified in the specific virtual asset at IDENTIFY ONE OR MORE VULNERABILITIES IN A SPECIFIC VIRTUAL ASSET OPERATION 403 are applied to the virtual asset creation template of IDENTIFY A VIRTUAL ASSET CREATION TEMPLATE ASSOCIATED WITH THE SPECIFIC VIRTUAL ASSET OPERATION 405 used to create the specific virtual asset and the entire class of virtual assets of the specific virtual asset.

In one embodiment, once the appropriate remedies of IDENTIFY AN APPROPRIATE REMEDY FOR EACH OF THE ONE OR MORE VULNERABILITIES IDENTIFIED IN THE SPECIFIC VIRTUAL ASSET OPERATION 407 for each of the one or more vulnerabilities identified in the specific virtual asset at IDENTIFY ONE OR MORE VULNERABILITIES IN A SPECIFIC VIRTUAL ASSET OPERATION 403 are applied to the virtual asset creation template of IDENTIFY A VIRTUAL ASSET CREATION TEMPLATE ASSOCIATED WITH THE SPECIFIC VIRTUAL ASSET OPERATION 405 used to create the specific virtual asset and the entire class of virtual assets of the specific virtual asset at APPLY THE APPROPRIATE REMEDIES FOR EACH OF THE ONE OR MORE VULNERABILITIES IDENTIFIED IN THE SPECIFIC VIRTUAL ASSET TO THE VIRTUAL ASSET CREATION TEMPLATE OPERATION 409, process flow proceeds to ASSIGN AN INITIAL STATUS OF VERIFIED VIRTUAL ASSET TO EACH VIRTUAL ASSET OF THE SPECIFIC VIRTUAL ASSET CLASS GENERATED USING THE VIRTUAL ASSET CREATION TEMPLATE OPERATION 411.

In one embodiment, at ASSIGN AN INITIAL STATUS OF VERIFIED VIRTUAL ASSET TO EACH VIRTUAL ASSET OF THE SPECIFIC VIRTUAL ASSET CLASS GENERATED USING THE VIRTUAL ASSET CREATION TEMPLATE OPERATION 411, once each vulnerability identified in the specific virtual asset is remedied at the virtual asset creation template level at APPLY THE APPROPRIATE REMEDIES FOR EACH OF THE ONE OR MORE VULNERABILITIES IDENTIFIED IN THE SPECIFIC VIRTUAL ASSET TO THE VIRTUAL ASSET CREATION TEMPLATE OPERATION 409, each virtual asset of the virtual asset class of the specific virtual asset generated using the virtual asset creation template is assumed to be free of the identified vulnerabilities and is assigned an initial status of verified virtual asset.

In one embodiment, once each virtual asset of the virtual asset class of the specific virtual asset generated using the virtual asset creation template is assumed to be free of the identified vulnerabilities and is assigned an initial status of verified virtual asset at ASSIGN AN INITIAL STATUS OF VERIFIED VIRTUAL ASSET TO EACH VIRTUAL ASSET OF THE SPECIFIC VIRTUAL ASSET CLASS GENERATED USING THE VIRTUAL ASSET CREATION TEMPLATE OPERATION 411, the verified virtual assets are deployed, or published, and used as intended in a production computing environment.

However, once deployed, any changes to the state, or operational parameters, of the verified virtual assets of ASSIGN AN INITIAL STATUS OF VERIFIED VIRTUAL ASSET TO EACH VIRTUAL ASSET OF THE SPECIFIC VIRTUAL ASSET CLASS GENERATED USING THE VIRTUAL ASSET CREATION TEMPLATE OPERATION 411 can be problematic in that the changes made may open, or reopen, vulnerabilities associated with individual initially verified virtual assets, i.e., the virtual assets may no longer be in a verified state.

To address this issue, in one embodiment, at MONITOR THE STATE OF EACH VERIFIED VIRTUAL ASSET TO IDENTIFY CHANGES MADE TO THE VERIFIED VIRTUAL ASSET OPERATION 413, the initially verified virtual assets of ASSIGN AN INITIAL STATUS OF VERIFIED VIRTUAL ASSET TO EACH VIRTUAL ASSET OF THE SPECIFIC VIRTUAL ASSET CLASS GENERATED USING THE VIRTUAL ASSET CREATION TEMPLATE OPERATION 411 are monitored to detect any changes made to any of the initially verified virtual assets.

In one embodiment, once the initially verified virtual assets of ASSIGN AN INITIAL STATUS OF VERIFIED VIRTUAL ASSET TO EACH VIRTUAL ASSET OF THE SPECIFIC VIRTUAL ASSET CLASS GENERATED USING THE VIRTUAL ASSET CREATION TEMPLATE OPERATION 411 are being monitored to detect any changes made to any of the initially verified virtual assets at MONITOR THE STATE OF EACH VERIFIED VIRTUAL ASSET TO IDENTIFY CHANGES MADE TO THE VERIFIED VIRTUAL ASSET OPERATION 413, process flow proceeds to IDENTIFY A CHANGE MADE TO A VERIFIED VIRTUAL ASSET OPERATION 415.

In one embodiment, at IDENTIFY A CHANGE MADE TO A VERIFIED VIRTUAL ASSET OPERATION 415 a change in an individual initially verified virtual asset of ASSIGN AN INITIAL STATUS OF VERIFIED VIRTUAL ASSET TO EACH VIRTUAL ASSET OF THE SPECIFIC VIRTUAL ASSET CLASS GENERATED USING THE VIRTUAL ASSET CREATION TEMPLATE OPERATION 411 is detected.

In one embodiment, once a change in an individual initially verified virtual asset of ASSIGN AN INITIAL STATUS OF VERIFIED VIRTUAL ASSET TO EACH VIRTUAL ASSET OF THE SPECIFIC VIRTUAL ASSET CLASS GENERATED USING THE VIRTUAL ASSET CREATION TEMPLATE OPERATION 411 is detected at IDENTIFY A CHANGE MADE TO A VERIFIED VIRTUAL ASSET OPERATION 415, process flow proceeds to TRANSFORM THE STATUS OF THE CHANGED VERIFIED VIRTUAL ASSET TO THAT OF UNVERIFIED VIRTUAL ASSET OPERATION 417.

In one embodiment, at TRANSFORM THE STATUS OF THE CHANGED VERIFIED VIRTUAL ASSET TO THAT OF UNVERIFIED VIRTUAL ASSET OPERATION 417 the status of the initially verified virtual asset detected as being changed at IDENTIFY A CHANGE MADE TO A VERIFIED VIRTUAL ASSET OPERATION 415 is transformed from the initial status of verified virtual asset of ASSIGN AN INITIAL STATUS OF VERIFIED VIRTUAL ASSET TO EACH VIRTUAL ASSET OF THE SPECIFIC VIRTUAL ASSET CLASS GENERATED USING THE VIRTUAL ASSET CREATION TEMPLATE OPERATION 411 to a status of unverified virtual asset.

In one embodiment, once the status of the initially verified virtual asset detected as being changed at IDENTIFY A CHANGE MADE TO A VERIFIED VIRTUAL ASSET OPERATION 415 is transformed from the initial status of verified virtual asset of ASSIGN AN INITIAL STATUS OF VERIFIED VIRTUAL ASSET TO EACH VIRTUAL ASSET OF THE SPECIFIC VIRTUAL ASSET CLASS GENERATED USING THE VIRTUAL ASSET CREATION TEMPLATE OPERATION 411 to a status of unverified virtual asset at TRANSFORM THE STATUS OF THE CHANGED VERIFIED VIRTUAL ASSET TO THAT OF UNVERIFIED VIRTUAL ASSET OPERATION 417, process flow proceeds to INDIVIDUALLY ANALYZE THE UNVERIFIED VIRTUAL ASSET FOR VULNERABILITIES OPERATION 419.

In one embodiment, at INDIVIDUALLY ANALYZE THE UNVERIFIED VIRTUAL ASSET FOR VULNERABILITIES OPERATION 419 the newly identified unverified virtual asset of TRANSFORM THE STATUS OF THE CHANGED VERIFIED VIRTUAL ASSET TO THAT OF UNVERIFIED VIRTUAL ASSET OPERATION 417 is individually analyzed to identify any vulnerabilities in the unverified virtual asset and if one or more vulnerabilities are identified in the unverified virtual asset at INDIVIDUALLY ANALYZE THE UNVERIFIED VIRTUAL ASSET FOR VULNERABILITIES OPERATION 419, a remedy is applied to each vulnerability identified in the unverified virtual asset at APPLY A REMEDY TO EACH VULNERABILITY IDENTIFIED IN THE UNVERIFIED VIRTUAL ASSET OPERATION 421.

In one embodiment, if no vulnerability is identified in the unverified virtual asset at INDIVIDUALLY ANALYZE THE UNVERIFIED VIRTUAL ASSET FOR VULNERABILITIES OPERATION 419, or after each vulnerability identified in the unverified virtual asset is remedied at REMEDY TO EACH VULNERABILITY IDENTIFIED IN THE UNVERIFIED VIRTUAL ASSET OPERATION 421, process flow proceeds to TRANSFORM THE STATUS OF UNVERIFIED VIRTUAL ASSET BACK TO THAT OF VERIFIED VIRTUAL ASSET OPERATION 423.

In one embodiment, at TRANSFORM THE STATUS OF UNVERIFIED VIRTUAL ASSET BACK TO THAT OF VERIFIED VIRTUAL ASSET OPERATION 423 the status of the unverified virtual asset of TRANSFORM THE STATUS OF THE CHANGED VERIFIED VIRTUAL ASSET TO THAT OF UNVERIFIED VIRTUAL ASSET OPERATION 417 is transformed back to a status of verified virtual asset.

In one embodiment, once the status of the unverified virtual asset of TRANSFORM THE STATUS OF THE CHANGED VERIFIED VIRTUAL ASSET TO THAT OF UNVERIFIED VIRTUAL ASSET OPERATION 417 is transformed back to a status of verified virtual asset at TRANSFORM THE STATUS OF UNVERIFIED VIRTUAL ASSET BACK TO THAT OF VERIFIED VIRTUAL ASSET OPERATION 423, process flow proceeds back to MONITOR THE STATE OF EACH VERIFIED VIRTUAL ASSET TO IDENTIFY CHANGES MADE TO THE VERIFIED VIRTUAL ASSET OPERATION 413.

As noted above, at MONITOR THE STATE OF EACH VERIFIED VIRTUAL ASSET TO IDENTIFY CHANGES MADE TO THE VERIFIED VIRTUAL ASSET OPERATION 413, the verified virtual assets are monitored to detect any changes made to any of the verified virtual assets.

Using process 400 for providing an efficient vulnerability management and verification service discussed herein, a vulnerability is identified at the virtual asset level in a specific virtual asset, such as a specific instance of a virtual asset, and then the remedy to the vulnerability is identified and applied at the virtual asset creation template level. As a result, using process 400 for providing an efficient vulnerability management and verification service, a single application of a remedy to an identified vulnerability in a specific virtual asset is used to remedy all virtual assets created using the given virtual asset creation template.

Consequently, using process 400 for providing an efficient vulnerability management and verification service, there is no need to individually remedy each virtual asset of a virtual asset class created using the virtual asset creation template. As a result, minimal resources are required to ensure each virtual asset of a given virtual asset class is free of defined vulnerabilities and/or conforms to various, and dynamically defined, security policies.

Then, using one embodiment of process 400 for providing an efficient vulnerability management and verification service, if an individual initially verified virtual asset is altered, the status of the altered virtual asset is transformed to that of unverified virtual asset. The unverified virtual asset is then individually analyzed to determine if any vulnerabilities have been introduced. In this way, using process 400 for providing an efficient vulnerability management and verification service, only changed virtual assets are individually analyzed. This again results in minimal resources being required to ensure each virtual asset of a given virtual asset class is free of defined vulnerabilities and/or conforms to various, and dynamically defined, security policies.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for providing an efficient vulnerability management and verification service comprising:
    at least one processor; and
    at least one memory coupled to the at least one processor, the at least one memory unit having stored therein instructions which when executed by any set of the one or more processors, perform a process for providing an efficient vulnerability management and verification service, the process for providing an efficient vulnerability management and verification service including:
    identifying a virtual asset creation template, wherein the virtual asset creation template is associated with a class of virtual assets, wherein the virtual asset creation template is used to create each virtual asset of the class of virtual assets;
    obtaining virtual asset creation template data representing the virtual asset creation template, wherein at least part of the virtual asset creation template data includes steps, instructions, and/or operations used to create each virtual asset of the class of virtual assets;

analyzing the virtual asset creation template data to identify any vulnerabilities in the virtual asset creation template data;

if one or more vulnerabilities are identified in the virtual asset creation template data, creating a remedied virtual asset creation template by applying to the virtual asset creation template a remedy to each vulnerability identified in the virtual asset creation template data;

generating one or more virtual assets using the virtual asset creation template;

if no vulnerability is identified in the virtual asset creation template data, or each vulnerability identified in the virtual asset creation template data is remedied, transforming an initial status of each virtual asset of the virtual asset class generated using the virtual asset creation template to an initial status of verified;

monitoring the verified virtual assets of the virtual asset class generated using the virtual asset creation template to detect any changes made to any of the monitored verified virtual assets;

if a change in a monitored verified virtual asset is detected, transforming the status of the changed monitored verified virtual asset to a status of unverified;

analyzing the unverified virtual asset to identify any vulnerabilities in the unverified virtual asset;

if one or more vulnerabilities are identified in the unverified virtual asset, applying a remedy to each vulnerability identified in the unverified virtual asset; and if no vulnerability is identified in the unverified virtual asset, or each vulnerability identified in the unverified virtual asset is remedied, transforming the status of the unverified virtual asset to a status of verified.

2. The system for providing an efficient vulnerability management and verification service of claim 1 wherein at least part of the virtual asset creation template data is selected from the group of virtual asset creation template data consisting of:
- a tool and/or system for creating and managing a collection of related cloud resources;
- a configuration management tool associated with the class of virtual assets; and
- a virtual appliance used to instantiate each virtual asset of the class of virtual assets.

3. The system for providing an efficient vulnerability management and verification service of claim 1 wherein the virtual asset class is a virtual asset class selected from the group of the virtual asset classes consisting of:
- a virtual machine class;
- a virtual server class;
- a virtual database or data store class;
- a specific type of instance instantiated in a cloud environment;
- an application development process class; and
- an application class.

4. The system for providing an efficient vulnerability management and verification service of claim 1 wherein each virtual asset of the class of virtual assets created using the virtual asset creation template has the same defined initial operational parameters selected from the group of operational parameters consisting of;
- the function of the virtual assets of the virtual asset class;
- the connectivity of the virtual assets of the virtual asset class;
- the storage capability allocated to the virtual assets of the virtual asset class;
- the processing capability allocated to the virtual assets of the virtual asset class;
- the hardware allocated to the virtual assets of the virtual asset class;
- the software allocated to virtual assets of the virtual asset class; and
- any combination thereof.

5. A system for providing an efficient and self-healing vulnerability management and verification service comprising:

at least one processor; and at least one memory coupled to the at least one processor, the at least one memory unit having stored therein instructions which when executed by any set of the one or more processors, perform a process for providing an efficient and self-healing vulnerability management and verification service, the process for providing an efficient and self-healing vulnerability management and verification service including:

obtaining vulnerability management policy data;

obtaining scanner data representing one or more scanner tests capable of discovering one or more vulnerabilities in a virtual asset creation template;

obtaining remedy data representing one or more remedies associated with vulnerabilities scanned for by the one or more scanner tests;

correlating the remedy data with vulnerabilities discoverable by the scanner tests;

identifying a virtual asset creation template, wherein the virtual asset creation template is associated with a class of virtual assets, wherein the virtual asset creation template is used to create each virtual asset of the class of virtual assets;

obtaining virtual asset creation template data representing the virtual asset creation template, wherein at least part of the virtual asset creation template data includes steps, instructions, and/or operations used to create each virtual asset of the class of virtual assets;

analyzing the vulnerability management data and the virtual asset creation template data to automatically identify a relevant scanner test in the scanner data to be applied to the virtual asset creation template data;

automatically deploying the relevant scanner test on the virtual asset creation template data;

if a vulnerability is identified by the relevant scanner test, identifying the remedy in the remedy data associated with the identified vulnerability;

automatically creating a remedied virtual asset creation template by applying to the virtual asset creation template the identified remedy to the virtual asset creation template data;

generating one or more virtual assets using the virtual asset creation template;

if no vulnerability is identified in the virtual asset creation template data, or each vulnerability identified in the virtual asset creation template data is remedied, transforming an initial status of each virtual asset of the virtual asset class generated using the virtual asset creation template to an initial status of verified;

monitoring the verified virtual assets of the virtual asset class generated using the virtual asset creation template to detect any changes made to any of the monitored verified virtual assets;

if a change in a monitored verified virtual asset is detected, transforming the status of the changed monitored verified virtual asset to a status of unverified;

analyzing the vulnerability management data and the unverified virtual asset to automatically identify a relevant scanner test in the scanner data to be applied to the unverified virtual asset;

automatically deploying the relevant scanner test on the unverified virtual asset;

if a vulnerability is identified by the relevant scanner test, identifying the remedy in the remedy data associated with the identified vulnerability;

automatically applying the identified remedy to the unverified virtual asset; and if no vulnerability is identified in the unverified virtual asset, or each vulnerability identified in the unverified virtual asset is remedied, transforming the status of the unverified virtual asset to a status of verified.

6. The system for providing an efficient and self-healing vulnerability management and verification service of claim 5 wherein the vulnerability management policy data is open-ended to allow for the addition, deletion, and/or modification of vulnerabilities and vulnerability characteristics represented by the vulnerability management data.

7. The system for providing an efficient and self-healing vulnerability management and verification service of claim 5 wherein the scanner data is open-ended to allow for the addition, deletion, and/or modification of scanner tests represented by the scanner data.

8. The system for providing an efficient and self-healing vulnerability management and verification service of claim 5 wherein the remedy data is open-ended to allow for the addition, deletion, and/or modification of remedies represented by the remedy data.

9. The system for providing an efficient and self-healing vulnerability management and verification service of claim 5 wherein at least one of the vulnerabilities discoverable by the one or more scanner tests are vulnerabilities included in the group of vulnerabilities consisting of:

the existence of a known weakness pattern in the virtual asset creation template data;

a lack of security requirements, or insufficient security requirements associated with the virtual asset creation template data;

the existence of a known vulnerable version of software or code included in the virtual asset creation template data;

code written in a language, or version of a language in the virtual asset creation template data known to be vulnerable to attack;

lack of encryption, or the proper level of encryption, indicated in the virtual asset creation template data;

no checks of buffer lengths indicated in the virtual asset creation template data;

no checks of the integrity of arguments indicated in the virtual asset creation template data; and any combination thereof.

10. The system for providing an efficient and self-healing vulnerability management and verification service of claim 5 wherein at least one of the remedies associated with vulnerabilities discoverable by the scanner tests is selected from the group of remedies consisting of:

automatic application of a software patch via the virtual asset creation template data;

automatic installation of a software version update via the virtual asset creation template data;

automatic deletion of a virtual asset component indicated in the virtual asset creation template data;

automatic replacement of a virtual asset component indicated in the virtual asset creation template data;

an automatic change to a configuration indicated in the virtual asset creation template data;

automatic re-sizing of buffers and buffer pools indicated in the virtual asset creation template data;

automatic re-setting or changing a response time indicated in the virtual asset creation template data; and any combination thereof.

11. The system for providing an efficient and self-healing vulnerability management and verification service of claim 5 wherein at least part of the virtual asset creation template data is selected from the group of virtual asset creation template data consisting of:

a tool and/or system for creating and managing a collection of related cloud resources;

a configuration management tool associated with the class of virtual assets; and a virtual appliance used to instantiate each virtual asset of the class of virtual assets.

12. The system for providing an efficient and self-healing vulnerability management and verification service of claim 5 wherein the virtual asset class is a virtual asset class selected from the group of the virtual asset classes consisting of:

a virtual machine class;

a virtual server class;

a virtual database or data store class;

a specific type of instance instantiated in a cloud environment;

an application development process class; and an application class.

13. The system for providing an efficient vulnerability management and verification service of claim 5 wherein each virtual asset of the class of virtual assets created using the virtual asset creation template has the same defined initial operational parameters selected from the group of operational parameters consisting of;

the function of the virtual assets of the virtual asset class;

the connectivity of the virtual assets of the virtual asset class;

the storage capability allocated to the virtual assets of the virtual asset class;

the processing capability allocated to the virtual assets of the virtual asset class;

the hardware allocated to the virtual assets of the virtual asset class;

the software allocated to virtual assets of the virtual asset class; and any combination thereof.

14. A system for providing an efficient vulnerability management and verification service comprising:

a virtual asset creation template, wherein the virtual asset creation template is associated with a class of virtual assets, wherein the virtual asset creation template is used to create each virtual asset of the class of virtual assets;

virtual asset creation template data representing the virtual asset creation template, wherein at least part of the virtual asset creation template data includes steps, instructions, and/or operations used to create each virtual asset of the class of virtual assets;

a vulnerability analysis module for analyzing the virtual asset creation template data to identify any vulnerabilities in the virtual asset creation template data;

a remedy application module for creating a remedied virtual asset creation template by applying to the virtual asset creation template one or more remedies mapped to one or more vulnerabilities identified in the virtual asset creation template data by the vulnerability analysis module;

generating one or more virtual assets using the virtual asset creation template;

a verification status module for assigning an initial status to each virtual asset of the virtual asset class generated using the virtual asset creation template data, the verification status module transforming an initial status of each virtual asset of the virtual asset class generated using the virtual asset creation template to an initial status of verified if no vulnerability is identified in the virtual asset creation template data by the vulnerability analysis module, or if each vulnerability identified in the virtual asset creation template data at the vulnerability analysis module is remedied at the remedy application module;

a virtual asset state monitoring module for monitoring the verified virtual assets of the virtual asset class generated using the virtual asset creation template data to detect any changes made to any of the monitored verified virtual assets;

if a change in monitored verified virtual asset is detected, transforming the status of the changed monitored virtual asset to a status of unverified using the verification status module;

an unverified virtual asset vulnerability analysis module for analyzing the unverified virtual asset to identify any vulnerabilities in the unverified virtual asset;

an unverified virtual asset remedy application module for applying a remedy to each vulnerability identified by the unverified virtual asset vulnerability analysis module; and if no vulnerability is identified in the unverified virtual asset by the unverified virtual asset vulnerability analysis module, or each vulnerability identified in the unverified virtual asset is remedied by the unverified virtual asset remedy application module, transforming the status of the unverified virtual asset to a status of verified using the verification status module.

15. The system for providing an efficient vulnerability management and verification service of claim 14 wherein at least part of the virtual asset creation template data is selected from the group of virtual asset creation template data consisting of:

a tool and/or system for creating and managing a collection of related cloud resources;

a configuration management tool associated with the class of virtual assets; and a virtual appliance used to instantiate each virtual asset of the class of virtual assets.

16. The system for providing an efficient vulnerability management and verification service of claim 14 wherein the virtual asset class is a virtual asset class selected from the group of the virtual asset classes consisting of:

a virtual machine class;
a virtual server class;
a virtual database or data store class;
a specific type of instance instantiated in a cloud environment;
an application development process class; and
an application class.

17. The system for providing an efficient vulnerability management and verification service of claim 14 wherein each virtual asset of the class of virtual assets created using the virtual asset creation template has the same defined initial operational parameters selected from the group of operational parameters consisting of;

the function of the virtual assets of the virtual asset class;
the connectivity of the virtual assets of the virtual asset class;
the storage capability allocated to the virtual assets of the virtual asset class;
the processing capability allocated to the virtual assets of the virtual asset class;
the hardware allocated to the virtual assets of the virtual asset class;
the software allocated to virtual assets of the virtual asset class; and
any combination thereof.

18. A system for providing an efficient and self-healing vulnerability management and verification service comprising:

a virtual asset creation template, wherein the virtual asset creation template is associated with a class of virtual assets, wherein the virtual asset creation template is used to create each virtual asset of the class of virtual assets;

virtual asset creation template data representing the virtual asset creation template, wherein at least part of the virtual asset creation template data includes steps, instructions, and/or operations used to create each virtual asset of the class of virtual assets;

a vulnerability analysis module for analyzing the virtual asset creation template data to identify any vulnerabilities in the virtual asset creation template data;

a remedy database, the remedy database including one or more remedies for one or more vulnerabilities;

if one or more vulnerabilities are identified in the virtual asset creation template data, creating a remedied virtual asset creation template by applying to the virtual asset creation template a remedy to each vulnerability identified in the virtual asset creation template data;

a vulnerability to remedy mapping module, the vulnerability to remedy mapping module matching a given vulnerability to one or more associated remedies;

a remedy application module for applying one or more associated remedies mapped to one or more vulnerabilities identified in the virtual asset creation template data;

generating one or more virtual assets using the virtual asset creation template;

a verification status module for assigning an initial status to each virtual asset of the virtual asset class generated using the virtual asset creation template data, the verification status module transforming an initial status of each virtual asset of the virtual asset class generated using the virtual asset creation template to an initial status of verified if no vulnerability is identified in the virtual asset creation template data by the vulnerability analysis module, or if each vulnerability identified in the virtual asset creation template data at the vulnerability analysis module is remedied at the remedy application module;

a virtual asset state monitoring module for monitoring the verified virtual assets of the virtual asset class generated using the virtual asset creation template data to detect any changes made to any of the verified virtual assets;

if a change in a monitored verified virtual asset is detected, transforming the status of the changed monitored virtual asset to a status of unverified using the verification status module;

an unverified virtual asset vulnerability analysis module for analyzing the unverified virtual asset to identify any vulnerabilities in the unverified virtual asset;

an unverified virtual asset remedy application module for applying a remedy to each vulnerability identified by the unverified virtual asset vulnerability analysis module; and if no vulnerability is identified in the unverified virtual asset by the unverified virtual asset vulnerability analysis module, or each vulnerability identified in the unverified virtual asset is remedied by the unverified virtual asset remedy application module, transforming the status of the unverified virtual asset to a status of verified using the verification status module.

19. The system for providing an efficient and self-healing vulnerability management and verification service of claim 18 wherein at least part of the virtual asset creation template data is selected from the group of virtual asset creation template data consisting of:
   a tool and/or system for creating and managing a collection of related cloud resources;
   a configuration management tool associated with the class of virtual assets; and
   a virtual appliance used to instantiate each virtual asset of the class of virtual assets.

20. The system for providing an efficient and self-healing vulnerability management and verification service of claim 18 wherein the virtual asset class is a virtual asset class selected from the group of the virtual asset classes consisting of:
   a virtual machine class;
   a virtual server class;
   a virtual database or data store class;
   a specific type of instance instantiated in a cloud environment;
   an application development process class; and
   an application class.

21. The system for providing an efficient vulnerability management and verification service of claim 18 wherein each virtual asset of the class of virtual assets created using the virtual asset creation template has the same defined initial operational parameters selected from the group of operational parameters consisting of;
   the function of the virtual assets of the virtual asset class;
   the connectivity of the virtual assets of the virtual asset class;
   the storage capability allocated to the virtual assets of the virtual asset class;
   the processing capability allocated to the virtual assets of the virtual asset class;
   the hardware allocated to the virtual assets of the virtual asset class;
   the software allocated to virtual assets of the virtual asset class; and
   any combination thereof.

22. A system for providing an efficient vulnerability management and verification service comprising:
   at least one processor; and
   at least one memory coupled to the at least one processor, the at least one memory unit having stored therein instructions which when executed by any set of the one or more processors, perform a process for providing an efficient vulnerability management and verification service, the process for providing an efficient vulnerability management and verification service including:
   identifying one or more vulnerabilities in a specific virtual asset;
   identifying a virtual asset creation template, wherein the virtual asset creation template is associated with a virtual asset class of the specific virtual asset, wherein the virtual asset creation template is used to create each virtual asset of the virtual asset class of the specific virtual asset, wherein the virtual asset creation template includes steps, instructions, and/or operations used to create each virtual asset of the virtual asset class of the specific virtual asset;
   creating a remedied virtual asset creation template by applying a remedy to each vulnerability identified in the specific virtual asset to the virtual asset creation template;
   generating one or more virtual assets using the virtual asset creation template;
   transforming an initial status of each virtual asset of the virtual asset class of the specific virtual asset generated using the virtual asset creation template to an initial status of verified;
   monitoring the verified virtual assets of the virtual asset class of the specific virtual asset generated using the virtual asset creation template to detect any changes made to any of the monitored verified virtual assets;
   if a change in a monitored verified virtual asset is detected, transforming the status of the initially verified virtual asset to a status of unverified;
   analyzing the unverified virtual asset to identify any vulnerabilities in the unverified virtual asset;
   if one or more vulnerabilities are identified in the unverified virtual asset, applying a remedy to each vulnerability identified in the unverified virtual asset; and
   if no vulnerability is identified in the unverified virtual asset, or each vulnerability identified in the unverified virtual asset is remedied, transforming the status of the unverified virtual asset to a status of verified.

23. The system for providing an efficient vulnerability management and verification service of claim 22 wherein the virtual asset creation template is selected from the group of virtual asset creation template data consisting of:
   a tool and/or system for creating and managing a collection of related cloud resources;
   a configuration management tool associated with the class of virtual assets; and
   a virtual appliance used to instantiate each virtual asset of the class of virtual assets.

24. The system for providing an efficient vulnerability management and verification service of claim 22 wherein the virtual asset class of the specific virtual asset is a virtual asset class selected from the group of the virtual asset classes consisting of:
   a virtual machine class;
   a virtual server class;
   a virtual database or data store class;
   a specific type of instance instantiated in a cloud environment;
   an application development process class; and
   an application class.

25. The system for providing an efficient vulnerability management and verification service of claim 22 wherein each virtual asset of the virtual asset class of the specific virtual asset created using the virtual asset creation template has the same defined initial operational parameters selected from the group of operational parameters consisting of;
   the function of the virtual assets of the virtual asset class;
   the connectivity of the virtual assets of the virtual asset class;
   the storage capability allocated to the virtual assets of the virtual asset class;
   the processing capability allocated to the virtual assets of the virtual asset class;

the hardware allocated to the virtual assets of the virtual asset class;
the software allocated to virtual assets of the virtual asset class; and
any combination thereof.

* * * * *